US012657820B2

(12) United States Patent
Kang et al.

(10) Patent No.: US 12,657,820 B2
(45) Date of Patent: Jun. 16, 2026

(54) VIRTUAL WEATHER INTERACTION METHOD AND APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Liang Kang, Shenzhen (CN); Wei Qin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 81 days.

(21) Appl. No.: 18/630,926

(22) Filed: Apr. 9, 2024

(65) Prior Publication Data

US 2024/0257459 A1 Aug. 1, 2024

Related U.S. Application Data

(63) Continuation of application No. PCT/CN2023/086173, filed on Apr. 4, 2023.

(30) Foreign Application Priority Data

May 13, 2022 (CN) .......................... 202210524937.3

(51) Int. Cl.
 *G06T 17/05* (2011.01)
 *G06T 3/40* (2024.01)
 (Continued)

(52) U.S. Cl.
 CPC ................ *G06T 17/05* (2013.01); *G06T 3/40* (2013.01); *G06T 7/20* (2013.01); *G06T 13/40* (2013.01)

(58) Field of Classification Search
 CPC .. G06T 17/05; G06T 3/40; G06T 7/20; G06T 13/40; G06T 13/00; G06T 19/00;
 (Continued)

(56) References Cited

U.S. PATENT DOCUMENTS

2005/0187741 A1 8/2005 Gilbert
2009/0079587 A1 3/2009 Satoh
 (Continued)

FOREIGN PATENT DOCUMENTS

CN 105335571 A 2/2016
CN 110147231 A 8/2019
 (Continued)

OTHER PUBLICATIONS

Tencent Technology, ISR, PCT/CN2023/086173, Jun. 21, 2023, 2 pgs.

*Primary Examiner* — Haixia Du
(74) *Attorney, Agent, or Firm* — Morgan, Lewis & Bockius LLP

(57) ABSTRACT

This application provides a virtual weather interaction method performed by an electronic device. The method includes: displaying a virtual scene; in response to a zoomed-in-state trigger operation, displaying a map of a first region of the virtual scene in a zoomed-in state; and in accordance with a determination that the first region in the map in the zoomed-in state is in a first weather state, playing a first special effect corresponding to the first weather state in at least one map grid comprised in the first region.

20 Claims, 17 Drawing Sheets

(51) Int. Cl.
  *G06T 7/20* (2017.01)
  *G06T 13/40* (2011.01)
(58) Field of Classification Search
  CPC .... G06T 3/4038; A63F 13/52; A63F 13/5255;
      A63F 13/5372; A63F 13/5378; G06F
          3/04815; G06F 3/04845
  See application file for complete search history.

(56) References Cited

U.S. PATENT DOCUMENTS

| | | | | |
|---|---|---|---|---|
| 2009/0083657 A1* | 3/2009 | Tsuji | ....................... | G01W 1/02 |
| | | | | 715/781 |
| 2009/0160873 A1* | 6/2009 | Kew | .................... | G09B 29/007 |
| | | | | 705/14.27 |
| 2013/0212509 A1* | 8/2013 | Van Seggelen | ........... | G06F 8/70 |
| | | | | 715/771 |
| 2013/0345959 A1* | 12/2013 | van Os | ................. | G09B 29/10 |
| | | | | 701/400 |

FOREIGN PATENT DOCUMENTS

| | | | | | |
|---|---|---|---|---|---|
| CN | 110706324 A | | 1/2020 | | |
| CN | 111127650 A | * | 5/2020 | ............. | G06F 16/51 |
| CN | 112637665 A | | 4/2021 | | |
| CN | 114307134 A | | 4/2022 | | |

* cited by examiner

Terminal 400

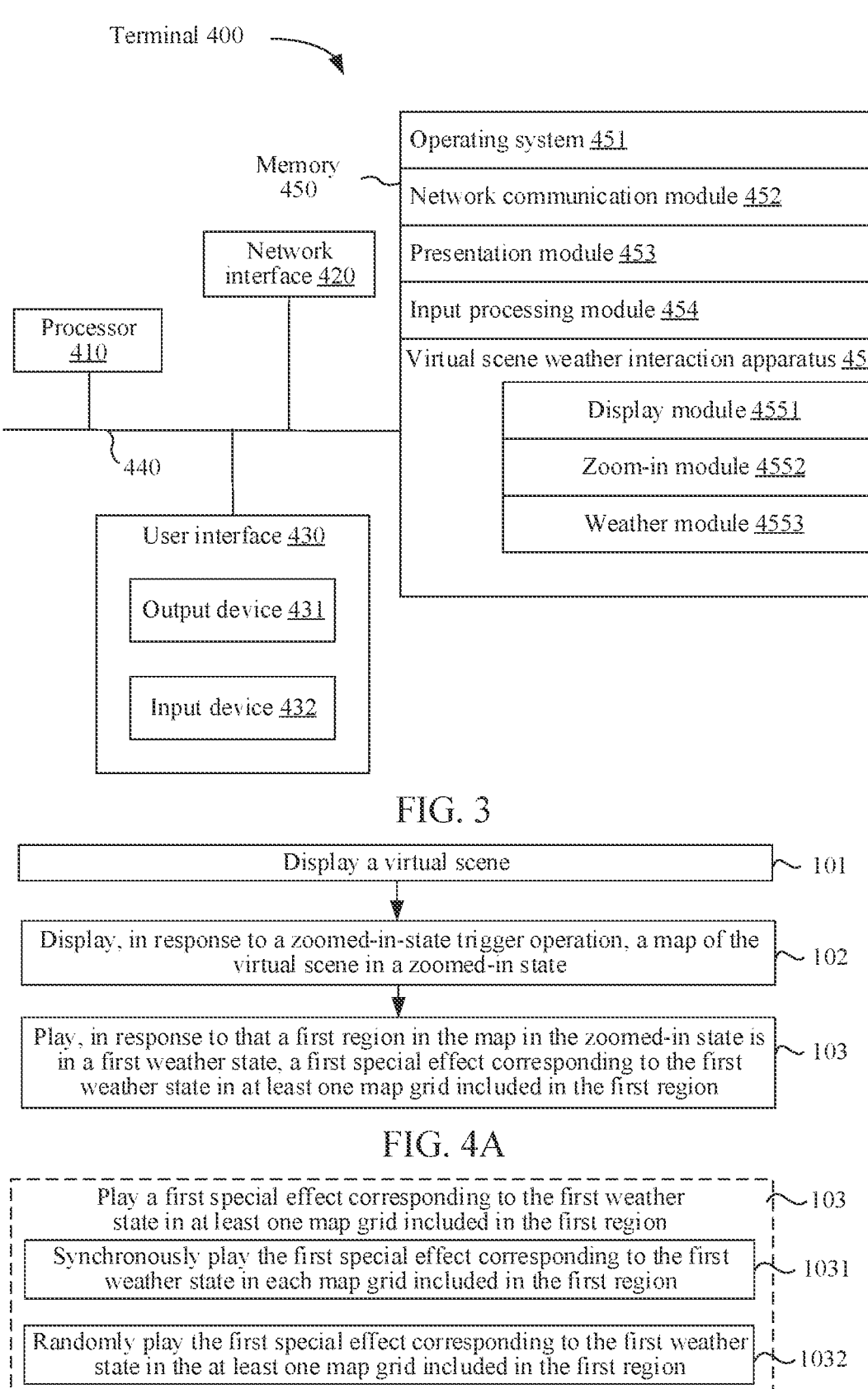

FIG. 3

| Display a virtual scene | ~ 101 |

| Display, in response to a zoomed-in-state trigger operation, a map of the virtual scene in a zoomed-in state | ~ 102 |

| Play, in response to that a first region in the map in the zoomed-in state is in a first weather state, a first special effect corresponding to the first weather state in at least one map grid included in the first region | ~ 103 |

FIG. 4A

| Play a first special effect corresponding to the first weather state in at least one map grid included in the first region | ~103 |
| Synchronously play the first special effect corresponding to the first weather state in each map grid included in the first region | ~ 1031 |
| Randomly play the first special effect corresponding to the first weather state in the at least one map grid included in the first region | ~1032 |

VIRTUAL WEATHER INTERACTION METHOD AND APPARATUS, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2023/086173, entitled "VIRTUAL WEATHER INTERACTION METHOD AND APPARATUS, ELECTRONIC DEVICE, COMPUTER-READABLE STORAGE MEDIUM, AND COMPUTER PROGRAM PRODUCT" filed on Apr. 4, 2023, which claims priority to Chinese Patent Application No. 202210524937.3, entitled "VIRTUAL WEATHER INTER-ACTION METHOD AND APPARATUS, ELECTRONIC DEVICE, COMPUTER-READABLE STORAGE MEDIUM, AND COMPUTER PROGRAM PRODUCT" filed on May 13, 2022, all of which is incorporated herein by reference in its entirety.

FIELD OF THE TECHNOLOGY

This application relates to human-computer interaction technologies, and in particular, to a virtual weather interaction method and apparatus, an electronic device, a computer-readable storage medium, and a computer program product.

BACKGROUND OF THE DISCLOSURE

Display technologies based on graphics processing hardware expand channels for perceiving environments and obtaining information. In particular, the multimedia technology for virtual scenes, with the help of human-computer interaction engine technologies, can implement diversified interactions between virtual objects controlled by users or artificial intelligence according to actual application requirements, has various typical application scenarios, and for example, in a virtual scene such as a game, can simulate a real battle process between the virtual objects.

In the related art, a weather mechanism is introduced to a game to enrich the interactive experience in the virtual scene. Usually, in a global map, a weather symbol is displayed in a region in which a special weather occurs, for indicating an approximate range of the weather-influenced region. A weather special effect is played in full screen on a zoomed-in map. In the related art, although the weather can be prompted in the virtual scene, the weather-influenced range cannot be accurately expressed.

SUMMARY

Embodiments of this application provide a virtual weather interaction method and apparatus, an electronic device, a computer-readable storage medium, and a computer program product, which can improve flexibility and accuracy of displaying a special effect for representing a weather state.

Technical solutions of the embodiments of this application are implemented as follows:

An embodiment of this application provides a virtual weather interaction method performed by an electronic device, the method including:

displaying a virtual scene;

in response to a zoomed-in-state trigger operation, displaying a map of a first region of the virtual scene in a zoomed-in state; and in accordance with a determination that the first region in the map in the zoomed-in state is in a first weather state, playing a first special effect corresponding to the first weather state in at least one map grid comprised in the first region.

An embodiment of this application provides an electronic device, including:

a memory, configured to store a computer executable instruction; and a processor, configured to execute the computer executable instruction stored in the memory and cause the electronic device to implement the virtual weather interaction method according to the embodiments of this application.

An embodiment of this application provides a non-transitory computer-readable storage medium, storing a computer executable instruction, the computer executable instruction, when executed by a processor of an electronic device, causing the electronic device to implement the virtual weather interaction method according to the embodiments of this application.

The embodiments of this application have the following beneficial effects:

A map in a zoomed-in state formed by splicing a plurality of map grids in a virtual scene is displayed. In response to that a first region in the map in the zoomed-in state is in a first weather state, a first special effect corresponding to the first weather state is played in at least one map grid included in the first region. Because the first special effect corresponding to the first weather state is played in the map grid in the first region, an influence range of the first weather state can be accurately reflected by using the grid. In addition, using the map grid as a carrier for the playing of the special effect can improve the playing flexibility of the first special effect.

BRIEF DESCRIPTION OF THE DRAWINGS

FIG. 3 is a schematic structural diagram of an electronic device according to an embodiment of this application.

FIG. 4A to FIG. 4C are each a schematic flowchart of a virtual weather interaction method according to an embodiment of this application.

DESCRIPTION OF EMBODIMENTS

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following description, the involved terms "first\second\third" are merely intended to distinguish between similar objects and do not represent a specific order of objects. It can be understood that "first\second\third" can be interchanged in a specific order or sequential order if allowed, so that the embodiments of this application described herein can be implemented in an order other than that illustrated or described herein.

Unless otherwise defined, meanings of all technical and scientific terms used in this specification are the same as those usually understood by a person skilled in the art of this application. Terms used in this specification are merely intended to describe objectives of the embodiments of this application, and are not intended to limit this application.

Before the embodiments of this application are further described in detail, a description is made on nouns and terms in the embodiments of this application, and the nouns and terms in the embodiments of this application are applicable to the following explanations.

(1) Two-level zoomable map: In various types of game virtual scenes, when a region of the virtual scene is vast, a map of the virtual scene needs to support zoom switching between two-level states of "global state" and "zoomed-in state", to facilitate rapid overview of global information and detailed review of local region information.

(2) Global state: used for displaying a state of a global map of a virtual scene. Information of the virtual scene displayed in the global state is relatively simple, such as a basic terrain, a regional weather, a field of view, and other overview information.

(3) Zoomed-in state: used for displaying a state of a local map of a virtual scene. In the zoomed-in state, a region with a smaller range than the global state is displayed in the virtual scene. In the zoomed-in state, information that is more detailed than in the global state is displayed in the virtual scene. There are many dimensions of information, including detailed information such as a specific terrain, a specific region layout, a weather range, a field of view, and entrenched creatures.

Figure 1A:
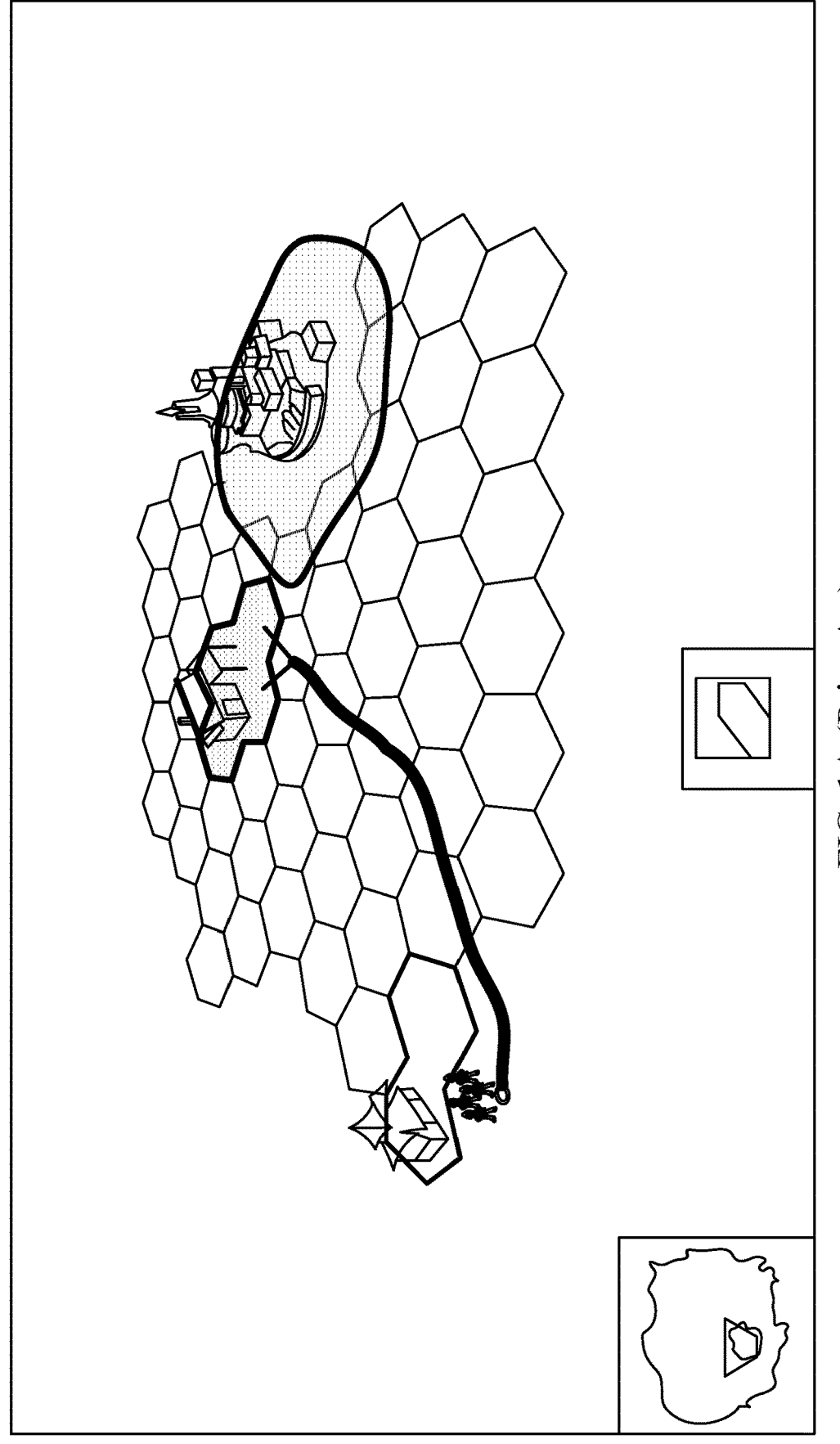
FIG. 1A is a schematic diagram of a three-dimensional map provided in the related art.
Figure 1B:
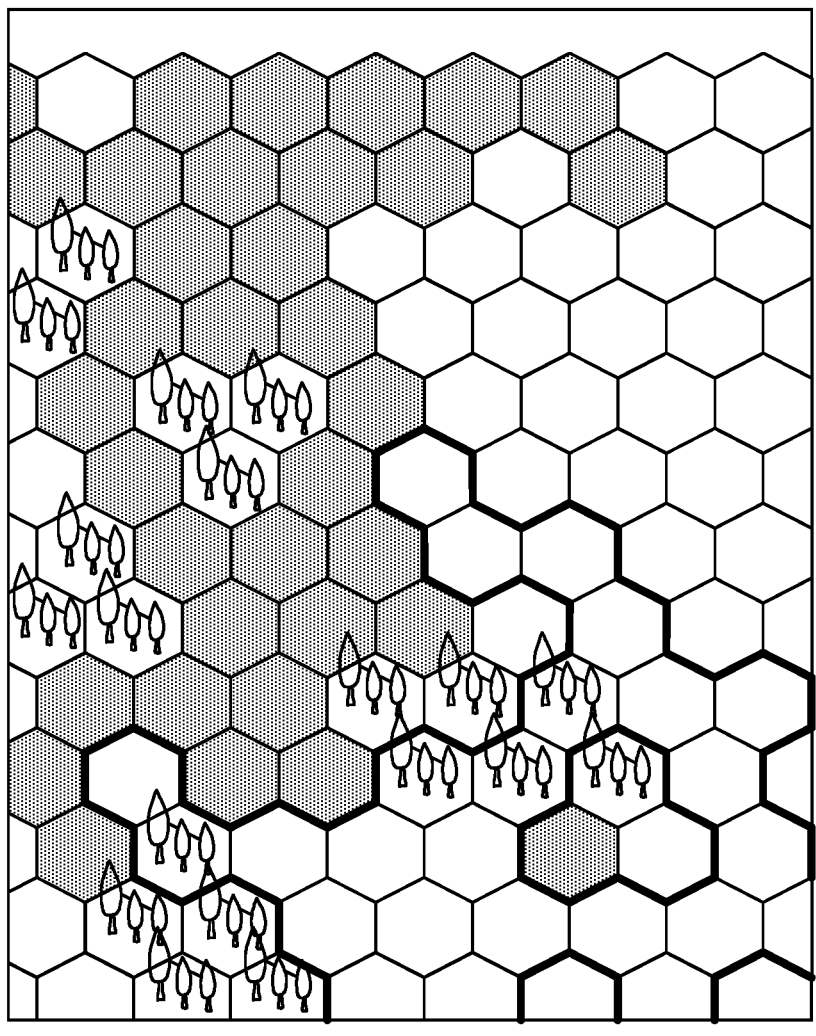
FIG. 1B is a schematic diagram of a two-dimensional map provided in the related art.

(4) Grid map: Grid map is a rasterized map. The grid map is represented in a form of using regular geometric shapes as minimum units of the map. Each minimum unit is flexibly arranged with exploration elements such as buildings, mountains, rivers, and monsters to form a large map with hundreds to tens of thousands of grids for players to explore and challenge. Referring to FIG. 1A, FIG. 1A shows a three-dimensional implementation of the grid map. FIG. 1B shows a two-dimensional implementation of the grid map.

(5) "In response to" is used for representing a condition or a state on which an operation to be performed depends. When the dependent condition or state is satisfied, one or more operations may be performed in real time or may have a specified delay. Unless otherwise specified, there is no restriction on the order of performing the plurality of operations.

(6) Cloud storage is a new concept extended and developed from the concept of cloud computing, and refers to a system in which a large number of different types of storage devices in a network are assembled to work together through application software by using functions such as cluster applications, grid technology, or distributed file systems, to jointly provide data storage and service access functions to the outside world. When the core of computing and processing of a cloud computing system is the storage and management of a large amount of data, a large number of storage devices need to be configured in the cloud computing system. In this case, the cloud computing system becomes a cloud storage system. Therefore, the cloud storage is a cloud computing system with data storage and management as its core.

Figure 1C:
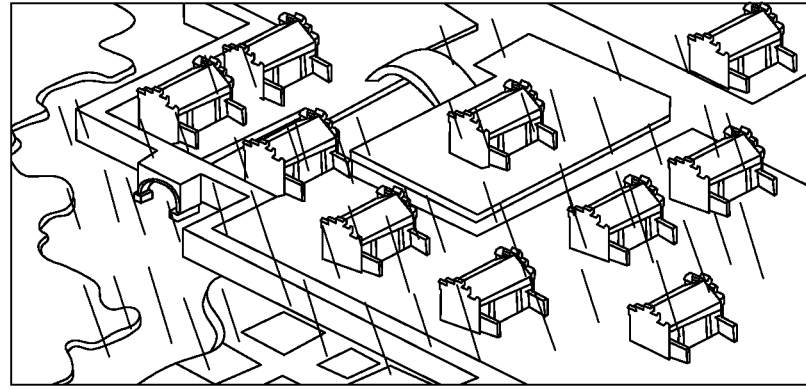
FIG. 1C is a schematic interface diagram of weather interaction provided in the related art.
Figure 1D:
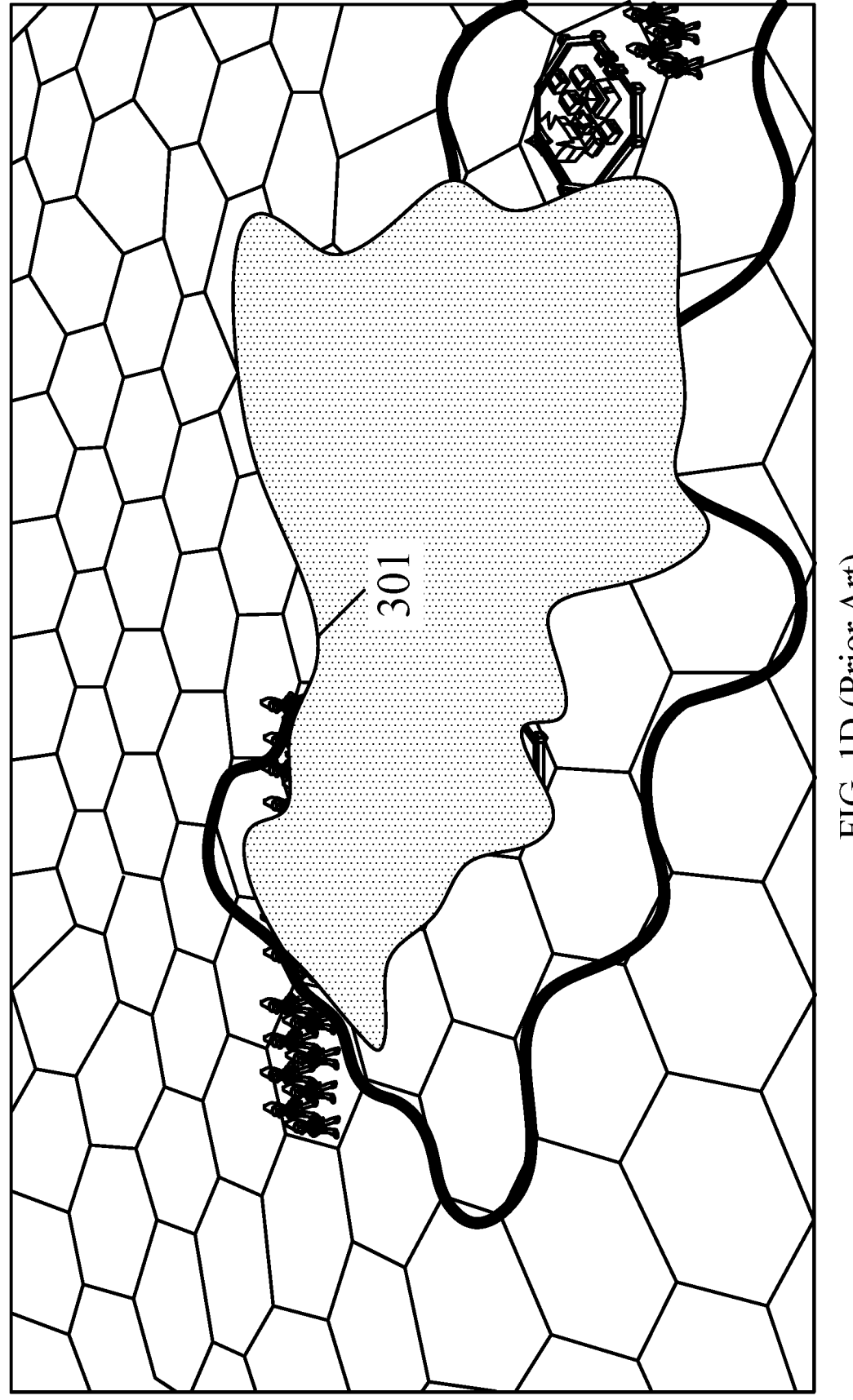
FIG. 1D is a schematic interface diagram of weather interaction provided in the related art.

In the related art, a weather mechanism is introduced to some games to enrich map-based interactive experience in virtual scenes. There is a need to display a specific region range of a particular weather state in a zoomed-in state. Referring to FIG. 1C, in a three-dimensional virtual scene, when a map is in a zoomed-in state, a full-screen weather special effect is played according to a weather state of most grids or a center grid on a screen. Referring to FIG. 1D, in a three-dimensional virtual scene, a weather special effect 301 representing a weather state is filled and tiled above the grid according to a weather range to form a uniform weather mask that follows and matches the specific region range of the weather state. When implementing the embodiments of this application, the applicant found the following problems in the related art: (1) A problem of basic adaptation exists. Both the weather presentation solutions can support only three-dimensional virtual scenes. Consequently, development costs are relatively high, and there are also high restrictions on game types and hardware conditions of a game hosting platform. It is impossible to apply a weather interaction mode to a two-dimensional virtual scene by applying the existing implementation solution of three-dimensional virtual scenes. (2) A problem of insufficient accuracy in a weather influence range exists. In FIG. 1C, the full-screen weather special effect is used to present the current weather. Although the effect is natural and intuitive, it can convey only an approximate weather state of a region in a range of the current screen, and cannot clearly indicate a specific weather influence range. (3) A problem of insufficient display flexibility of a weather special effect exists. Although the weather special effect in FIG. 1D can indicate a specific weather influence range, the weather special effect needs to be edge-cropped and tiled to reflect the specific influence range (for example, tiling of a cloud special effect shown in FIG. 1D). The overall development costs are high, the applicability is not wide, and the final presentation effect is relatively fixed.

The embodiments of this application provide a virtual weather interaction method and apparatus, an electronic device, a computer-readable storage medium, and a computer program product, which can improve flexibility and accuracy of displaying a special effect for representing a weather state. The following describes an exemplary application of the electronic device provided in the embodiments of this application. The electronic device provided in the embodiments of this application may be implemented as various types of user terminals such as a notebook computer, a tablet computer, a desktop computer, a set top box, or a mobile device (such as a mobile phone, a portable music player, a personal digital assistant, a dedicated messaging device, or a portable game device).

For easier understanding of the virtual weather interaction method provided in the embodiments of this application, an exemplary implementation scenario of the virtual weather interaction method provided in the embodiments of this application is first described. A virtual scene may be completely output based on a terminal, or output based on a collaboration between a terminal and a server.

In some embodiments, the virtual scene may be an environment for interaction between game characters. For example, the virtual scene may be used by the game characters to play against each other. The interaction may be performed in the virtual scene by controlling actions of virtual objects, so that users can relieve life stress during the game.

Figure 2:
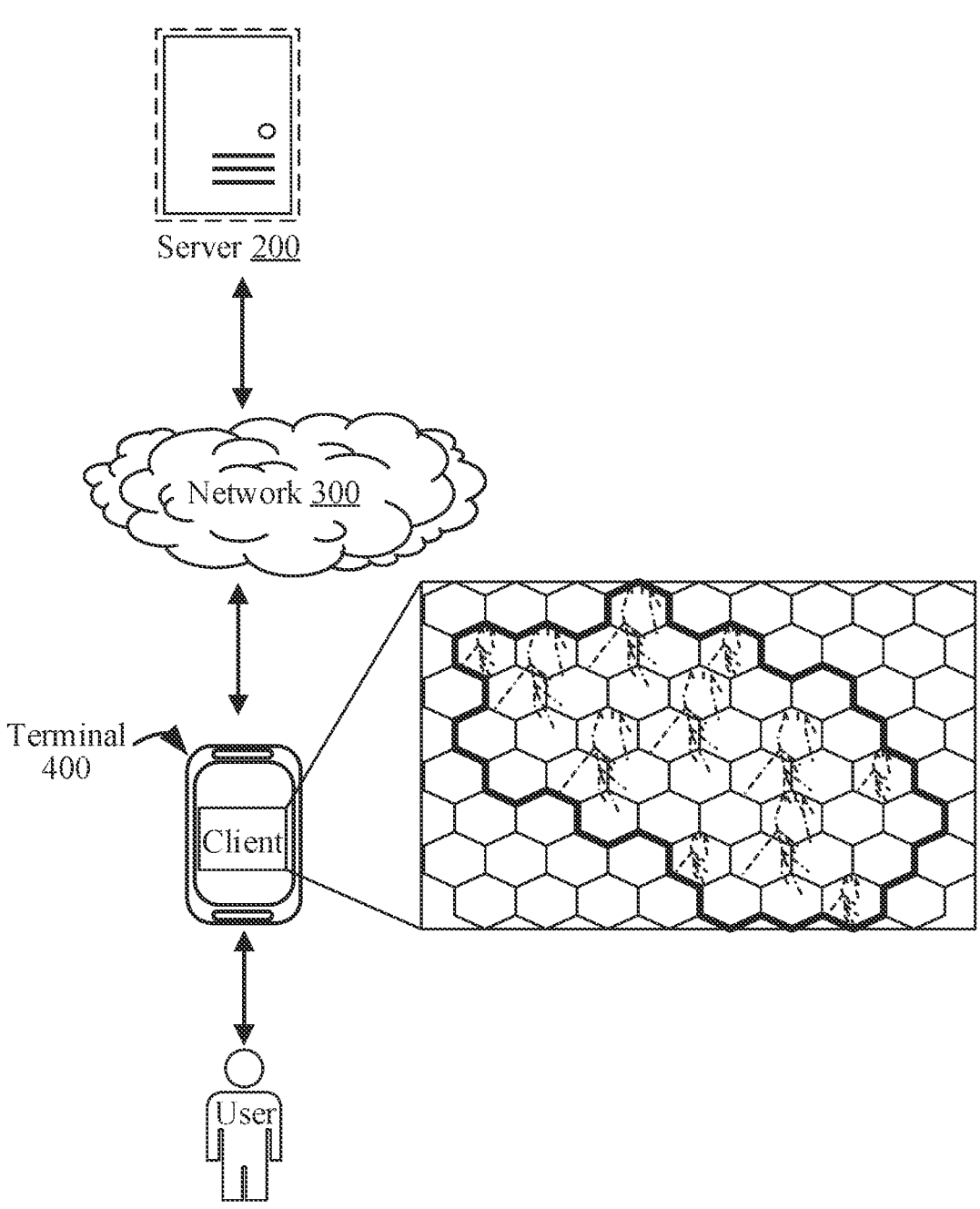
FIG. 2 is a schematic structural diagram of a virtual weather interaction system according to an embodiment of this application.

In another implementation scenario, referring to FIG. 2, FIG. 2 is a schematic diagram of an application mode of a virtual weather interaction method according to an embodiment of this application, applied to a terminal 400 and a server 200, and generally, applicable to an application mode in which virtual scene computing is completed relying on a computing capability of the server 200 and a virtual scene is output on the terminal 400.

In an example, an account may be used for logging in to a client (such as a game application of an online version) running on the terminal 400. The client responds to a zoomed-in-state trigger operation. The client sends operation data of the zoomed-in-state trigger operation to the server 200 through a network 300. The server 200 calculates display data of a map in a zoomed-in state based on the operation data, and sends the display data to the client. Based on the display data, the map in the zoomed-in state in the virtual scene is displayed in a human-computer interaction interface of the client, the map being formed by splicing a plurality of map grids. The server 200 calculates, based on weather configuration data, weather special effect data and range data of a first region that is affected, and sends the weather special effect data and the range data to the client. Based on the weather special effect data and the range data, the following display is performed in the human-computer interaction interface of the client: playing a first special effect corresponding to a first weather state in at least one map grid included in the first region.

In an example, an account is logged in to a client (such as a stand-alone game application) running on the terminal 400. The client responds to a zoomed-in-state trigger operation, calculates display data of a map in a zoomed-in state based on operation data, and displays, in a human-computer interaction interface of the client, the map in the zoomed-in state in the virtual scene based on the display data, the map being formed by splicing a plurality of map grids. The terminal 400 calculates, based on weather configuration data, weather special effect data and range data of a first region that is affected, and performs the following display in the human-computer interaction interface of the client based on the weather special effect data and the range data: playing a first special effect corresponding to a first weather state in at least one map grid included in the first region.

In some embodiments, the terminal 400 can implement the virtual weather interaction method provided in the embodiments of this application by running a computer program. For example, the computer program may be a native program in an operating system or a software module; may be a native application (APP), that is, a program that can be run only after being first installed in the operating system, such as a game APP (that is, the foregoing client) or a livestreaming APP; may be a mini program, that is, a program that can be run as long as it is downloaded to a browser environment; or may be a game mini program that can be embedded in any APP. In summary, the foregoing computer program may be any form of application, module, or plug-in.

The embodiments of this application may be implemented with the help of a cloud technology. The cloud technology is a hosting technology that unifies a series of resources such as hardware, software, and networks within a wide area network or a local area network to implement data calculation, storage, processing, and sharing.

The cloud technology is a general term for network technology, information technology, integration technology, management platform technology, and application technology that are applied based on cloud computing business modes, and can constitute a resource pool to be used as required, which is flexible and convenient. Cloud computing technology is to become an important support. Backend services of a technology network system need a large amount of computing and storage resources.

In an example, the server 200 may be an independent physical server, or may be a server cluster or a distributed system including a plurality of physical servers, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 may be a smartphone, a tablet computer, a notebook computer, a desktop computer, a smart speaker, a smartwatch, or the like, but is not limited thereto. The terminal 400 and the server 200 may be directly or indirectly connected in a wired or wireless communication manner. This is not limited in the embodiments of this application.

Referring to FIG. 3, FIG. 3 is a schematic structural diagram of an electronic device to which a virtual weather interaction method is applied according to an embodiment of this application. That the electronic device is a terminal is used as an example for description. The terminal 400 shown in FIG. 3 includes at least one processor 410, a memory 450, at least one network interface 420, and a user interface 430. Components in the terminal 400 are coupled together through a bus system 440. It may be understood that, the bus system 440 is configured to implement connection and communication between the components. In addition to a data bus, the bus system 440 also includes a power bus, a control bus, and a status signal bus. However, for clarity of description, various buses are marked as the bus system 440 in FIG. 3.

The processor 410 may be an integrated circuit chip and has a signal processing capability, for example, a general purpose processor, a digital signal processor (DSP), or another programmable logical device, a discrete gate or a transistor logical device, or a discrete hardware component. The general purpose processor may be a microprocessor, any conventional processor, or the like.

The user interface 430 includes one or more output devices 431 that enable presentation of media content, including one or more speakers and/or one or more visual display screens. The user interface 430 further includes one or more input devices 432, including a user interface component that facilitates user input, such as a keyboard, a mouse, a microphone, a touchscreen, a camera, and other input buttons and controls.

The memory 450 may be removable, non-removable, or a combination thereof. An exemplary hardware device includes a solid state memory, a hard disk drive, an optical disk drive, or the like. The memory 450 may include one or more storage devices that are physically located away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in the embodiments of this application is intended to include any suitable type of memory.

In some embodiments, the memory 450 can store data to support various operations. Examples of the data include programs, modules, and data structures, or subsets or supersets thereof, as exemplarily described below.

The operating system 451 includes system programs for processing various basic system services and performing hardware-related tasks, such as a framework layer, a kernel library layer, and a drive layer, and is configured to implement various basic services and process hardware-based tasks.

A network communication module 452 is configured to reach another electronic device through one or more (wired or wireless) network interfaces 420. An exemplary network interface 420 includes Bluetooth, wireless fidelity (WiFi), a universal serial bus (USB), or the like.

A presentation module 453 is configured to enable presentation of information through the one or more output devices 431 (such as display screens or speakers) associated with the user interface 430 (for example, a user interface configured to operate a peripheral device and display content and information).

An input processing module 454 is configured to detect one or more user inputs or interactions from one of the one or more input devices 432 and translate the detected inputs or interactions.

In some embodiments, the virtual weather interaction apparatus provided in the embodiments of this application may be implemented in a software manner. FIG. 3 shows a virtual weather interaction apparatus 455 stored in the memory 450. The virtual weather interaction apparatus may be software in the form of programs and plug-ins, including the following software modules: a display module 4551, a zoom-in module 4552, and a weather module 4553. These modules are logical and therefore, can be combined or further split according to functions that are implemented. The functions of the modules are to be described below.

The virtual weather interaction method provided in the embodiments of this application is described with reference to exemplary applications and implementations of the terminal provided in the embodiments of this application.

The following describes the virtual weather interaction method provided in the embodiments of this application. As above, the electronic device for implementing the virtual weather interaction method in the embodiments of this application may be a terminal device. Therefore, an execution body of each step is not repeatedly described below.

Referring to FIG. 4A, FIG. 4A is a schematic flowchart of a virtual weather interaction method according to an embodiment of this application. The method is to be described with reference to step 101 to step 103 shown in FIG. 4A.

Step 101: Display a virtual scene, at least one weather state being configured in the virtual scene.

In an example, the displayed virtual scene is a scene that is different from the real world and that is output by using a device. Through naked eyes or the assistance of the device, visual perception of the virtual scene can be formed, such as a two-dimensional image output through a display screen, and a three-dimensional image output through stereoscopic projection, virtual reality and augmented reality technologies, and other stereoscopic display technologies. In addition, various perceptions simulating the real world, such as auditory perception, tactile perception, olfactory perception, and motion perception, may be further formed through various possible hardware.

Step 102: Display, in response to a zoomed-in-state trigger operation, a map of the virtual scene in a zoomed-in state.

In an example, the map in the zoomed-in state is formed by splicing a plurality of map grids. The map may be a two-dimensional grid map or a three-dimensional grid map. As is formed by splicing a plurality of map grids, the map may be referred to as a grid map. Regular geometric shapes are used as minimum units of the grid map. Each minimum unit is flexibly arranged with exploration elements such as buildings, mountains, rivers, and monsters to form a large map with hundreds to tens of thousands of grids for players to explore and challenge. Referring to FIG. 1A, FIG. 1A shows a three-dimensional implementation of the grid map, and FIG. 1B shows a two-dimensional implementation of the grid map.

Step 103: Play, in response to that a first region in the map in the zoomed-in state is in a first weather state, a first special effect corresponding to the first weather state in at least one map grid included in the first region.

In an example, the first weather state is one of the at least one weather state. The map includes a plurality of weather regions. Each weather region has its corresponding weather state. The weather state includes at least one of the following: sunny, rainy, thunderstorm, hail, or snowy. The foregoing weather states are each a single weather state. Alternatively, the weather state may be a composite weather state. For example, a combination of sunny and windy is used as a weather state. When the first region in the map is in the first weather state, the first special effect corresponding to the first weather state is played in the at least one map grid included in the first region. The first special effect may be a static special effect or a dynamic special effect. For example, when the first weather state is a thunderstorm, a special effect of the thunderstorm is played in the at least one map grid included in the first region.

Figure 12A:
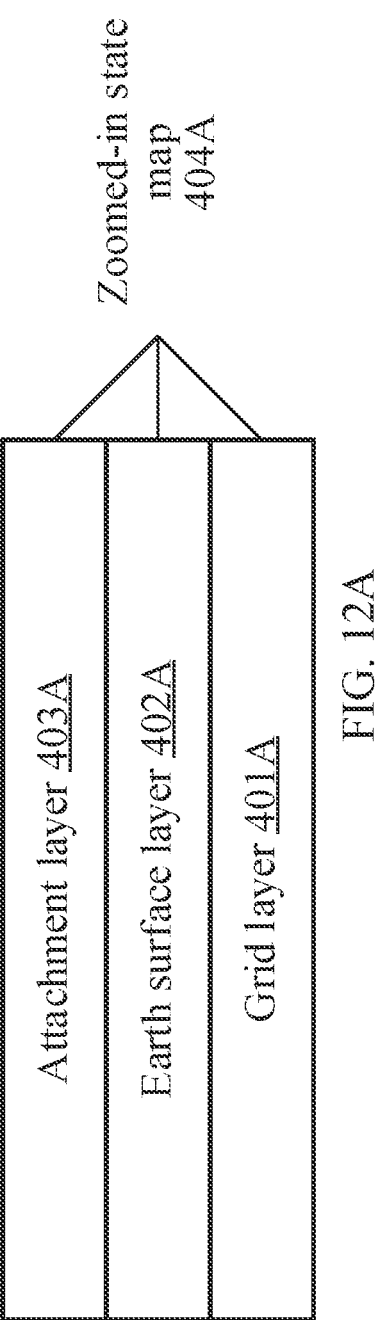
FIG. 12A is a schematic layer diagram of a map according to an embodiment of this application.
Figure 12B:
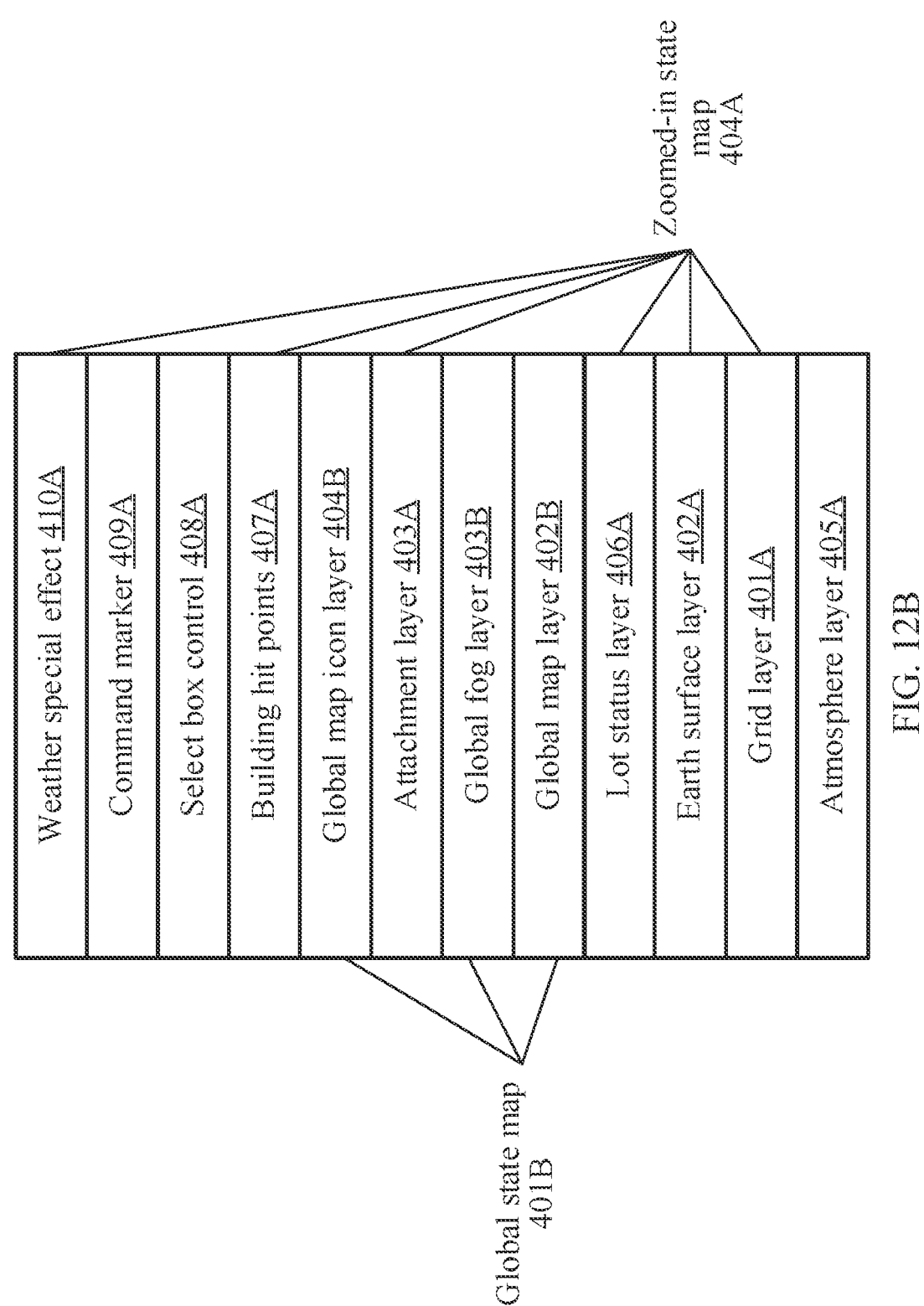
FIG. 12B is a schematic layer diagram of a map according to an embodiment of this application.

For ease of explanation and illustration, the following first describes a hierarchy of the grid map used in the embodiments of this application. Referring to FIG. 12A, FIG. 12A is a schematic layer diagram according to an embodiment of this application. A zoomed-in state map 404A includes a grid layer 401A, an earth surface layer 402A above the grid layer 401A, and an attachment layer 403A above the earth surface layer 402A. A grid corresponding to the grid layer 401A is a tiled grid, and each unit cell in the grid (the minimum unit geometry in the grid) has the same size and shape. The earth surface layer 402A includes a plurality of earth surface image materials. The earth surface image material is used for representing terrain information such as sandy soils, forests, and wilderness. The earth surface image materials have a one-to-one correspondence with the unit cells of the grid layer 401A. An earth surface image material in the each unit cell has the same size as the unit cell. The attachment layer 403A includes a blocker (such as a mountain, a river, or a forest), an interactive object (such as a building), a virtual enemy (such as a virtual monster), and other image materials. The grid layer 401A further includes a weather special effect 410A, a command marker 409A, a select box control 408A, and building hit points 407A. These image materials are represented in the form of entity diagrams. Referring to FIG. 12B, FIG. 12B is a schematic layer diagram according to an embodiment of this application. A global state map 401B includes a global map layer 402B, a global fog layer 403B, and a global map icon layer 404B. The global map layer 402B includes a global map material. The global fog layer 403B includes a global fog layer material. The global map icon layer 404B includes various different types of global icon materials. An angle is formed between a screen and a plane of each of the global map layer and the global fog layer. The global map layer and the global fog layer are parallel to a plane of an atmosphere layer of the grid map, and are parallel to the earth surface layer, the grid layer, a lot status layer, and a plane of the weather special effect in the zoomed-in state map.

The following describes a two-level zooming process of the zoomed-in state map and the global state map of the two-level map in the embodiments of this application.

For example, a zoom ratio may be adjusted in any one of the following manners: dragging an adjustment slider of a zoom scale of a map, and zooming the map according to a ratio corresponding to a current position of the adjustment slider in the zoom scale; zooming the map based on a sliding distance of a two-finger opposite sliding operation (for example: zooming out the map by sliding the thumb and the index finger closer together on the screen; conversely, zooming in map by sliding the two fingers apart on the screen); and zooming the map based on a scroll angle of a scroll wheel of a mouse (for example: scrolling forward the scroll wheel, and zooming in the map according to the number of steps by which the scroll wheel is scrolled; and scrolling backward the scroll wheel, and zooming out the map according to the number of steps by which the scroll wheel is scrolled backward).

For example, in the two-level zooming process of the zoomed-in state map and the global state map, within a zoom interval corresponding to a transition state, transparency of a zoomed-in map element and transparency of a global map element are adjusted according to a zoom percentage. In addition, during the transition between the zoomed-in state map and the global state map, within a zoom ratio interval of the transition state, an angle between the screen and a plane of each of a global map canvas and a zoomed-in map canvas changes with the zoom ratio, achieving seamless switching and canvas angle changes.

For example, the two-level large-scale map in the embodiments of this application includes all the layers in FIG. 12B. On this basis, with a preset coordinate point (such as the lower left corner of the map) as a starting point (x=0, y=0, a horizontal coordinate is denoted as x, and a longitudinal coordinate is denoted as y), a terrain, an interactive object, a blocker, and information are configured on each coordinate grid to generate a two-level large-scale map with any number of grids. In the zooming process, an appearance interval or a disappearance interval of an image material of a different layer is defined according to a zoom ratio of a horizontal axis. This can achieve seamless switching of elements of different layers in the two-level states.

Still referring to the upper and lower order of all the layers corresponding to FIG. 12B, the zoomed-in state map 404A includes a lot status layer 406A, the earth surface layer 402A, the grid layer 401A and the attachment layer 403A. It is assumed that in a zoom ratio interval of the zoomed-in state, transparency of each of the lot status layer 406A, the earth surface layer 402A, the grid layer 401A, the attachment layer 403A, and an atmosphere layer 405A does not change with the zoom ratio. The transparency of each of the layers is N %, and N is greater than or equal to 0 and less than or equal to 10. Transparency of each of the global fog layer 403B and the global map layer 402B of the global state map 401B is 100%. That is, in the zoom ratio interval of the zoomed-in state, the global state map is hidden and the zoomed-in state map is displayed.

In the zoom ratio interval of the transition state, the lot status layer 406A, the earth surface layer 402A, the grid layer 401A, the attachment layer 403A, the atmosphere layer 405A, the global map layer 402B, and the global fog layer 403B are displayed/hidden in a fade-in and fade-out manner. That is, within the zoom ratio interval of the transition state, the transparency of these layers changes with the zoom ratio.

The global state map 401B includes the global fog layer 403B and the global map layer 402B. It is assumed that in the zoom ratio interval of the global state, the transparency of each of the global fog layer 403B and the global map layer 402B does not change with the zoom ratio, transparency of each of the layers is N %, and N is greater than or equal to 0 and less than or equal to 10. The transparency of each of the lot status layer 406A, the earth surface layer 402A, the grid layer 401A, and the attachment layer 403A of the zoomed-in state map 404A is 100%. That is, in the zoom ratio interval of the zoomed-in state, the zoomed-in state map is hidden and the global state map is displayed.

In some embodiments, when the zoomed-in-state trigger operation is an accompanying operation, (the accompanying operation means that an operation result changes along with the operation; for example, the accompanying operation includes a two-finger zoom-out operation or a mouse scrolling operation), step 102 of displaying, in response to a zoomed-in-state trigger operation, a map of the virtual scene in a zoomed-in state may be implemented through the following technical solution: displaying a process of increasing a scale the map until the accompanying operation is released; and in parallel to increasing the scale, displaying a process of forming the plurality of map grids in the map. The map is zoomed in through the accompanying operation, and the user can perceive the entire zooming process, thereby effectively meeting the zooming requirement of the user and improving the efficiency of human-computer interaction.

Figure 6:
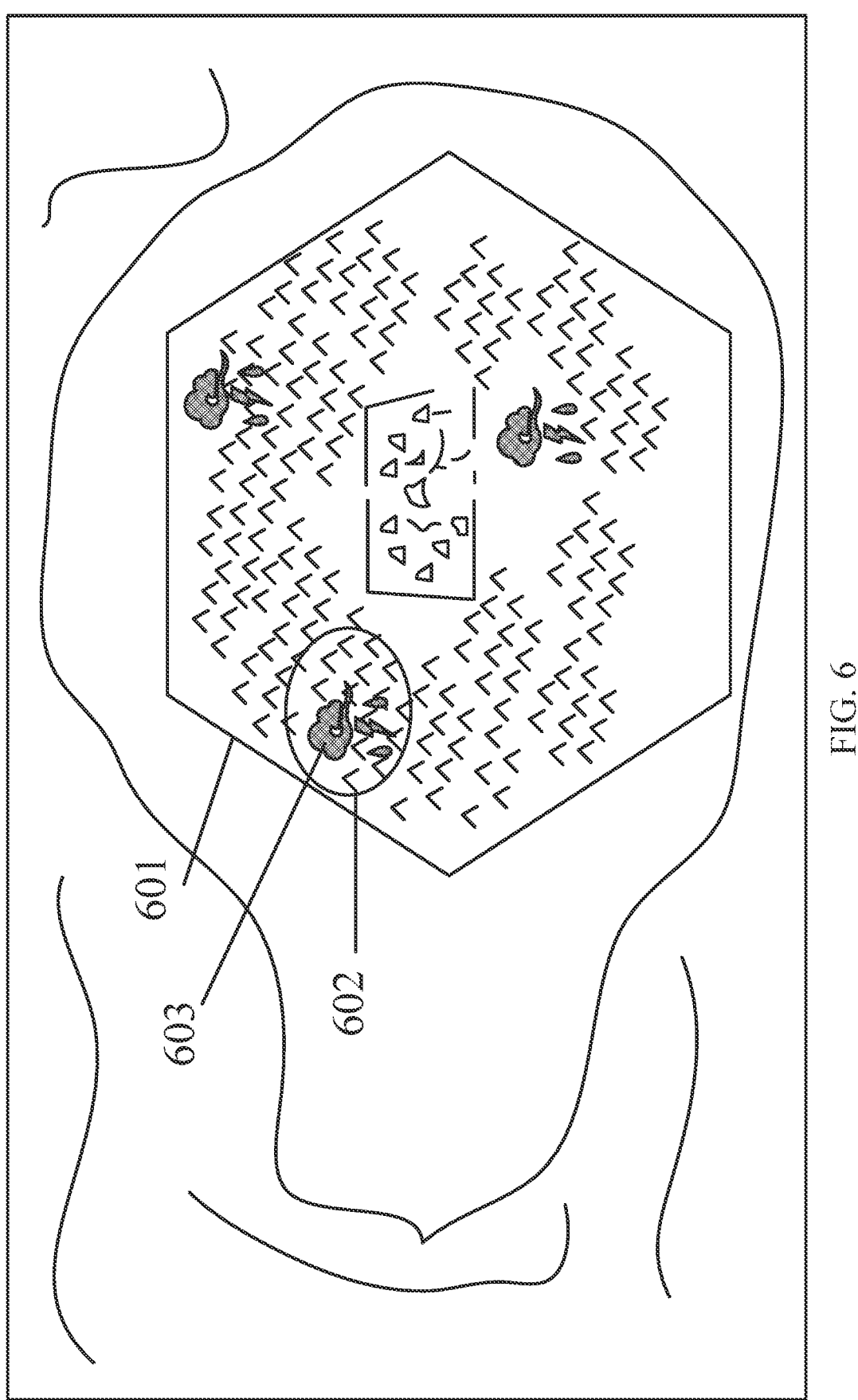
FIG. 6 is a schematic interface diagram of a virtual weather interaction method according to an embodiment of this application.

In an example, when the map is in the global state, the map of the virtual scene in the global state is displayed, and in response to the zoomed-in-state trigger operation, the map of the virtual scene in the zoomed-in state is displayed. Referring to FIG. 6, FIG. 6 shows a map in a global state. The map covers a city 601 and mountains surrounding the city 601. The zoomed-in-state trigger operation may be an accompanying operation such as a two-finger zoom-out operation. That is, when zooming out with two fingers, the change of the map from the global state to the zoomed-in state is displayed, that is, a process in which a scale of the map becomes larger is displayed. When the accompanying operation is released, the scale of the map no longer changes. In the process in which the scale becomes larger, the process of forming the plurality of map grids in the map is displayed. For example, in the map, an outer map grid is formed first, and then the map grids are formed in a direction from the outside to the inside. Alternatively, a map grid may be first formed in a trigger position of the zoomed-in-state trigger operation, and then the map grids are formed in a direction from the inside to the outside.

In some embodiments, when the zoomed-in-state trigger operation is a single setting operation, step 102 of displaying, in response to a zoomed-in-state trigger operation, a map of the virtual scene in a zoomed-in state may be implemented through the following technical solution: in response to a single setting operation for a target scale, displaying a map conforming to the target scale, and displaying the plurality of map grids in the map. The map is zoomed in through the single setting operation, and the user directly perceives a result of the zooming, thereby saving time in the zooming process and effectively improving the efficiency of human-computer interaction.

In an example, when the map is in the global state, the map of the virtual scene in the global state is displayed, and in response to the zoomed-in-state trigger operation, the map of the virtual scene in the zoomed-in state is displayed. Referring to FIG. 6, FIG. 6 shows a map in a global state. The map covers a city 601 and mountains surrounding the city 601. The zoomed-in-state trigger operation may be a single setting operation. For example, the scale is directly set to 1/100, without displaying the change of the map from the global state to the zoomed-in state. A map with the scale of 1/100 in the zoomed-in state may be directly displayed. The plurality of map grids are displayed in the map conforming to the target scale. A size of the map grid is adapted to the scale.

In some embodiments, in response to a global-state trigger operation, a map of the virtual scene in a global state is displayed, a region range indicated by the map exceeding a region range threshold, or a scale of the map being less than a scale threshold. Through the embodiments of this application, the map can be switched to the global state, thereby helping the user perceive global information and improving information perception efficiency.

In an example, when the map is in the zoomed-in state, the map of the virtual scene in the zoomed-in state is displayed, and in response to the global-state trigger operation, the map of the virtual scene in the global-state is displayed. The global-state trigger operation may be an accompanying operation such as a two-finger zoom-in operation. That is, when zooming in with two fingers, the change of the map from the zoomed-in state to the global state is displayed. Alternatively, the global-state trigger operation may be a single setting operation. For example, the scale is directly set to 1/100000, without displaying the change of the map from the zoomed-in state to the global state. A map with the scale of 1/100000 in the global state may be directly displayed.

In an example, map grids are no longer displayed in the map in the global state or a relatively small number of map grids are included in the map in the global state (that is, the number of map grids is less than a map network number threshold). A region range that can be represented by the map in the global state exceeds a region range threshold. The region range threshold may be a set proportion of a global range (for example, 60% of the global range), or the region range threshold may be a global range. Referring to FIG. 6, FIG. 6 shows a map in a global state. The map covers a city 601 and mountains surrounding the city 601, and a scale of the map in the global state is less than a scale threshold. For example, one square centimeter in the map in the global state can represent a city in the virtual scene. However, one square centimeter in the map in the zoomed-in state can represent only a store in the virtual scene.

In some embodiments, when the map of the virtual scene in the global state is displayed, in a central position of each second region in the map in the global state, prompt information of a second weather state corresponding to the second region. The second region is a different region obtained through division according to a configuration policy of the virtual scene. For example, in a virtual scene of the Three Kingdoms period, the second region may include a region representing Shu, a region representing Wei, and a region representing Wu. The prompt information includes at least one of the following: a weather symbol set or a weather name set. In addition to displaying the prompt information in the central position, the prompt information may also be displayed in any position in the second region. Displaying the prompt information corresponding to the second weather state in the map in the global state can reflect global weather state distribution as a whole and improve of information perception efficiency of users.

In an example, referring to FIG. 6, FIG. 6 shows a map in a global state. The map covers a city 601 and mountains surrounding the city 601. The city 601 includes a plurality of second regions, for example, second regions 602. In a central position of each second region in the map in the global state, prompt information of a second weather state corresponding to the second region is displayed. For example, in a central position of the second region 602, prompt information of a thunderstorm state corresponding to the second region 602 is displayed. The prompt information may be a weather symbol set 603, or the prompt information may be a weather name set. When the second weather state is a single weather state, the weather symbol set and the weather name set are each a single-element set. When the second weather state is a composite weather state, the weather symbol set and the weather name set are each a multi-element set. The composite weather state means that two or more weather states are included. If the second weather state is a thunderstorm accompanied by strong winds, the second weather state is a composite weather state, and the weather symbol set includes a symbol of thunderstorm and a symbol of wind.

In some embodiments, the following processing is performed for the each second region: performing supplementary processing on the second region in the map in the zoomed-in state to obtain a rectangle including the second region; obtaining diagonals of the rectangle in the map in the zoomed-in state and obtaining a position of an intersection point of the diagonals in the map in the zoomed-in state; and determining the central position of the second region in the map in the global state based on the position of the intersection point in the map in the zoomed-in state. The central position for displaying the prompt information in the global state map is determined with a position of the second region in the zoomed-in state map, so that the weather symbol set or the weather name set is displayed in the central position, thereby improving display accuracy of weather state distribution.

Figure 11:
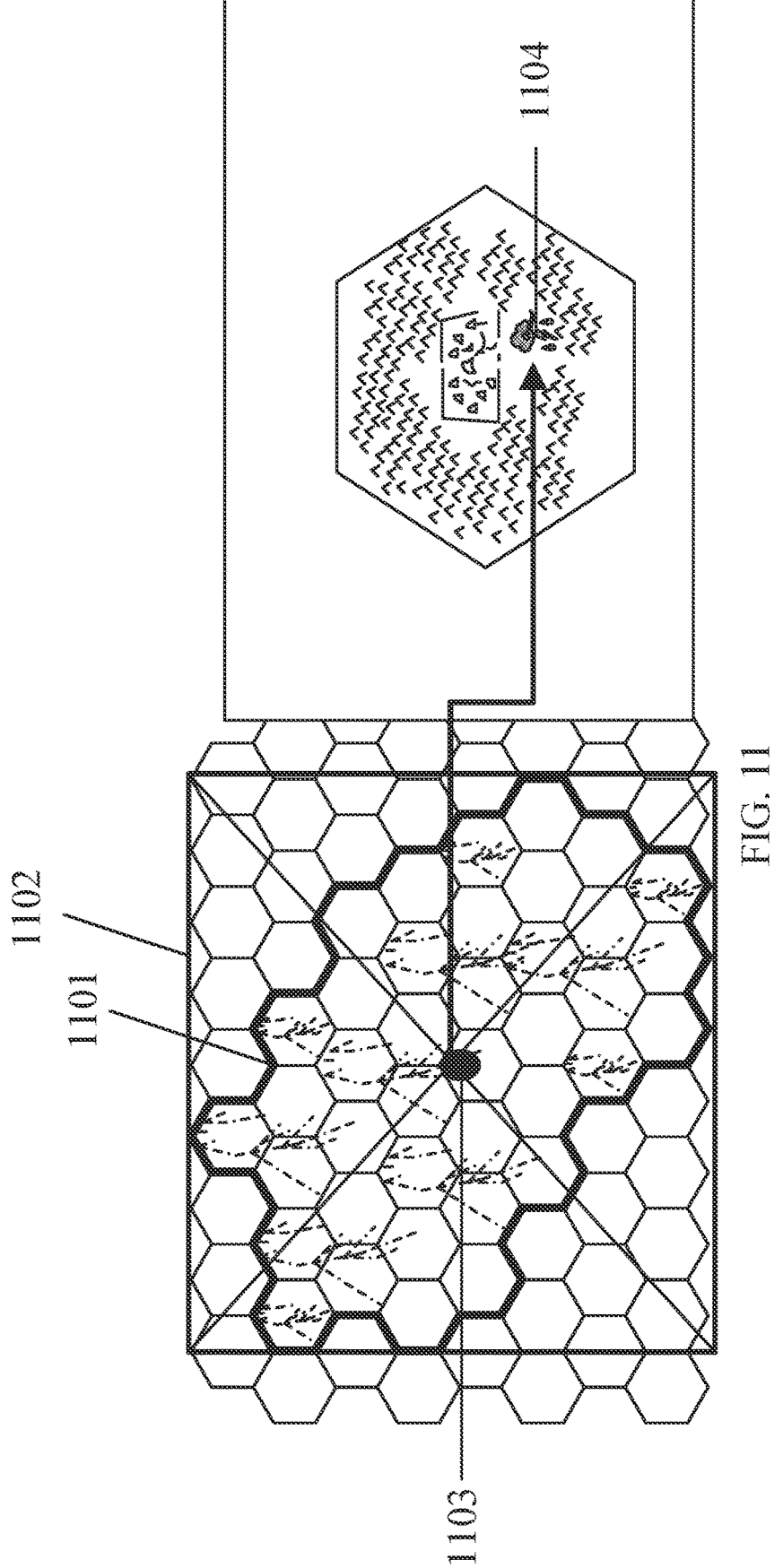
FIG. 11 is a schematic diagram of coordinate positioning of a virtual weather interaction method according to an embodiment of this application.

In an example, referring to FIG. 11, for a second region 1101 in FIG. 11, central position coordinates are determined based on an upper boundary and a lower boundary, a weather symbol is displayed in a position in which the central position coordinates are mapped to the global map, so that global weather distribution can be indicated. The upper boundary, the lower boundary, a left boundary, and a right boundary of the second region 1101 are obtained. A rectangle 1102 including the second region is obtained by performing supplementary processing on the second region 1101. An upper side, a lower side, a left side, and a right side of the rectangle 1102 are respectively the upper boundary, the lower boundary, the left boundary, and the right boundary of the second region 1101. Then, intersecting diagonals in the rectangle 1102 are obtained. An intersection point of the diagonals is used as a central position 1103 of the second region 1101. Coordinates of the central position 1103 in the map in the zoomed-in state are obtained. The coordinates of the central position 1103 in the map in the zoomed-in state are mapped to a position A in the map in the global state, and a weather symbol 1104 of the second weather state of the second region is displayed in the position A.

In some embodiments, the displaying, in a central position of each second region in the map in the global state, prompt information of a second weather state corresponding to the second region may be implemented through the following technical solution: performing the following processing for the each second region: displaying, in the central position of the second region in a first display manner, the prompt information of the second weather state corresponding to the second region, significance of the first display manner being positively correlated to a virtual parameter, the virtual parameter including at least one of the following: the number of virtual objects in the second region, an area of the second region, a severity degree of the second weather state, or a distance between a target virtual object and the central position, and the target virtual object being a virtual object controlled by an account that initiates the zoomed-in-state trigger operation. The prompt information of the second weather state in different second regions are displayed in a differentiated manner, thereby improving information perception efficiency of users.

In an example, referring to FIG. 11, the prompt information of the second weather state corresponding to the second region (for example, a weather symbol 1106) is displayed in the central position of the second region 1101 in a first display manner, significance of the first display manner being positively correlated to a virtual parameter, the virtual parameter including at least one of the following: the number of virtual objects in the second region, an area of the second region, a severity degree of the second weather state, or a distance between a target virtual object and the central position, and the target virtual object being a virtual object controlled by an account that initiates the zoomed-in-state trigger operation. For example, the number of virtual objects in a second region A is greater than that in a second region B. In this case, significance of prompt information of the second region A is greater than that of prompt information of the second region B. For another example, an area of a second region A is 10 square kilometers, and an area of a second region B is 5 square kilometers. In this case, significance of prompt information of the second region A is greater than that of prompt information of the second region B. For another example, a second weather state of a second region A is hail, and a second weather state of a second region B is sunny. Hail is clearly more severe than sunny. Therefore, significance of prompt information of the second region A is greater than that of prompt information of the second region B. The target virtual object is a virtual object controlled by a user A. The user A is a user that initiates the zoomed-in-state trigger operation. A distance between the user A and the second region A is less than a distance between the user A and the second region B. In this case, significance of prompt information of the second region A is greater than that of prompt information of the second region B.

In some embodiments, referring to FIG. 4B, FIG. 4B is a schematic flowchart of a virtual weather interaction method according to an embodiment of this application. Step 103 of playing a first special effect corresponding to the first weather state in at least one map grid included in the first region may be implemented through step 1031 or step 1032 in FIG. 4B.

Step 1031: Synchronously play the first special effect corresponding to the first weather state in each map grid included in the first region.

In some embodiments, the first special effect includes at least one special effect material, the first region includes at least one subregion, and step 1031 of synchronously playing the first special effect corresponding to the first weather state in each map grid included in the first region may be implemented through the following technical solution: synchronously performing the following processing for each subregion: playing a special effect material having a same size as the subregion in the subregion of the first region, the each subregion including at least one map grid. In this embodiment of this application, a sum of sizes of the at least one special effect material is the same as a size of the first region. The each special effect material is synchronously played. When the number of subregions is one, it is equivalent to that the subregion is the first region, and one special effect material is played in the first region. Synchronously playing special effect materials in all map grids can clearly reflect a range of the first region, thereby enabling users to accurately perceive a weather influence range and improving information perception efficiency.

Figure 8A:
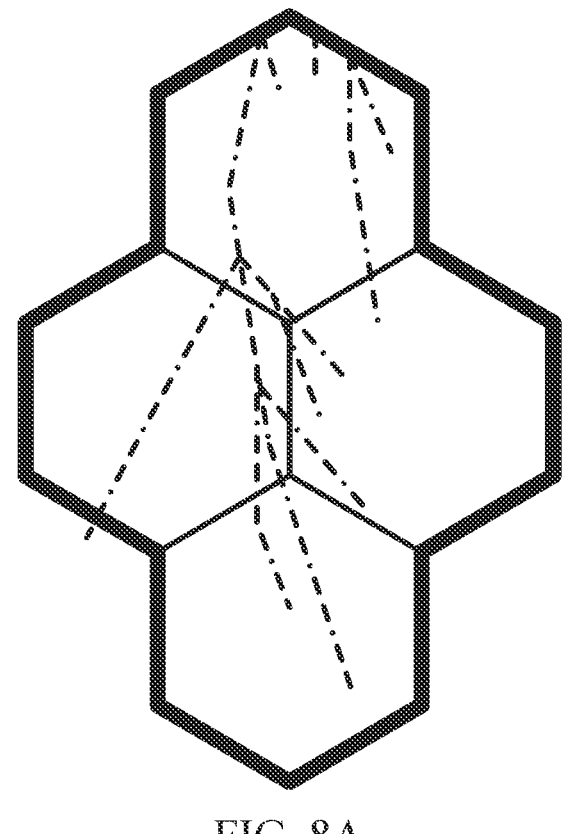
FIG. 8A is a schematic interface diagram of a virtual weather interaction method according to an embodiment of this application.
Figure 8B:
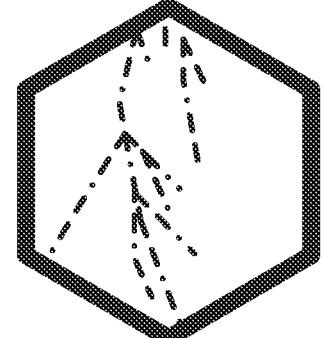
FIG. 8B is a schematic interface diagram of a virtual weather interaction method according to an embodiment of this application.

In an example, the first special effect includes at least one special effect material. For example, two types of special effect materials: a four-grid special effect material and a single-grid special effect material, may be configured. Configuring different sizes of special effect materials can present a differentiated visual effect in the entire first region during playing of special effects representing weather states. This is not limited to configuring two special effect materials, and more other sizes of special effect materials may be configured. For example, a double-grid special effect material may be configured. Referring to FIG. 8A, FIG. 8A shows a four-grid special effect material. The four-grid special effect material is a special effect material adapted to four map grids. The four grids may be arranged according to a style shown in FIG. 8A, or may be arranged according to another style. Referring to FIG. 8B, FIG. 8B shows a single-grid special effect material. The single-grid special effect material is a special effect material adapted to a single grid. Each type of special effect material has its own adapted grid style. The grid style includes the number of grids and the arrangement of grids.

Figure 9A:
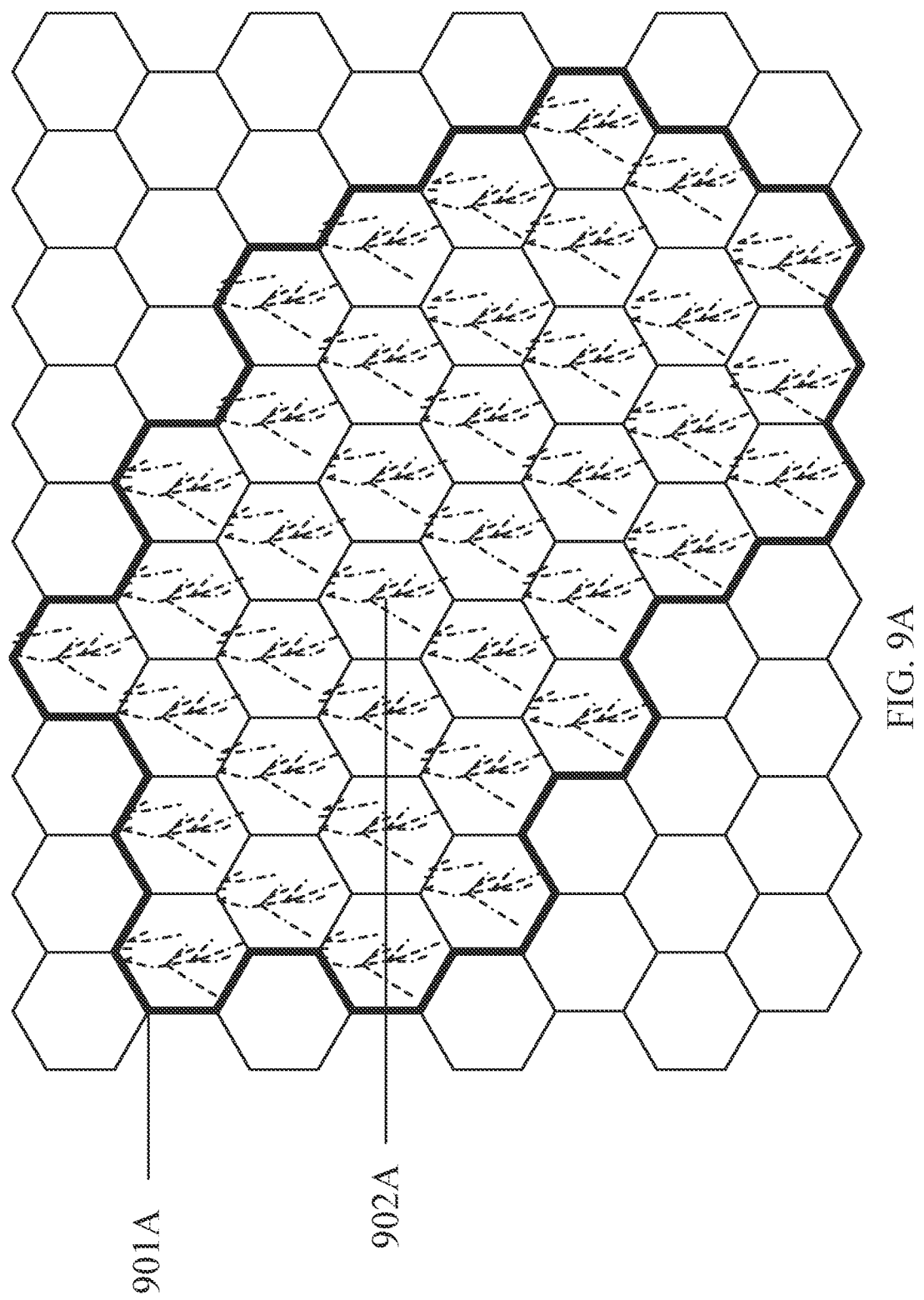
FIG. 9A is a schematic interface diagram of a virtual weather interaction method according to an embodiment of this application.

In an example, special effect materials are played on all grids of the first region synchronously at any moment. Referring to FIG. 9A, FIG. 9A shows a process of playing the first special effect in a first region 901A. The first region shown in FIG. 9A includes 39 map grids. Special effect materials shown in FIG. 9A are each a single-grid special effect material. The following processing is performed on each single-grid special effect material. A single-grid special effect material A is used as an example for description. The single-grid special effect material A is played in a subregion 902A of the first region. The subregion shown in FIG. 9A includes one map grid. A size of the special effect material is the same as a size of the subregion. Because the size of the single-grid special effect material is a single grid, the map grid included in the subregion is also a single grid. A sum of sizes of at least one special effect material is the same as the size of the first region. This indicates that each map grid in the first region is filled with a special effect material. For example, the each map grid is filled with a single-grid special effect material. The each single-grid special effect material is played synchronously, so that a weather special effect can be neatly displayed in the first region. Each playing of the weather special effect material lasts two to three seconds (playing duration). When the first weather state is maintained, the weather special effect material continues to be played to represent the weather state in real time.

Step 1032: Randomly play the first special effect corresponding to the first weather state in the at least one map grid included in the first region.

In some embodiments, the first special effect includes at least one special effect material, the first region includes a plurality of subregions, and when the first special effect is a dynamic special effect, step 1032 of randomly playing the first special effect corresponding to the first weather state in the at least one map grid included in the first region may be implemented through the following technical solution: playing the first special effect corresponding to the first weather state in the first region a plurality of times; and when playing the first special effect each time, synchronously performing the following processing for some subregions of the first region: playing a special effect material having a same size as each of the subregions in the subregion, the subregion including at least one map grid, and a time interval between any two adjacent plays being not greater than a single playing time of the special effect material. In this embodiment of this application, the special effect material played in the subregion has the same size as the subregion. A sum of sizes of subregions in which special effect materials are played is less than a size of the first region. The special effect materials involved in each play are synchronously played. A time interval between any two adjacent plays is not greater than a single playing time of the special effect material. Randomly playing a special effect material on the map grid in the first region enables the expression of a weather state to be more realistic, thereby improving display resource utilization while improving the realism of the special effect.

In some embodiments, when the number of the at least one special effect material is multiple, the at least one special effect material has at least two sizes, the size representing the number of map grids covered by the special effect material.

In an example, the first special effect includes at least one special effect material. For example, two types of special effect materials: a four-grid special effect material and a single-grid special effect material, may be configured. Referring to FIG. 8A, FIG. 8A shows a four-grid special effect material. The four-grid special effect material is a special effect material adapted to four map grids. The four grids may be arranged according to a style shown in FIG. 8A, or may be arranged according to another style. Referring to FIG. 8B, FIG. 8B shows a single-grid special effect material. The single-grid special effect material is a special effect material adapted to a single grid. Each type of special effect material has its own adapted grid style. The grid style includes the number of grids and the arrangement of grids. Any one special effect material can cover one or more map grids, which is specifically determined by game logic. For example, when an influence range of a thunderstorm weather is not greater than a range threshold, only the single-grid special effect material is played. When the influence range of the thunderstorm weather is greater than the range threshold, the single-grid special effect material and the four-grid special effect material may be played.

Figure 9B:
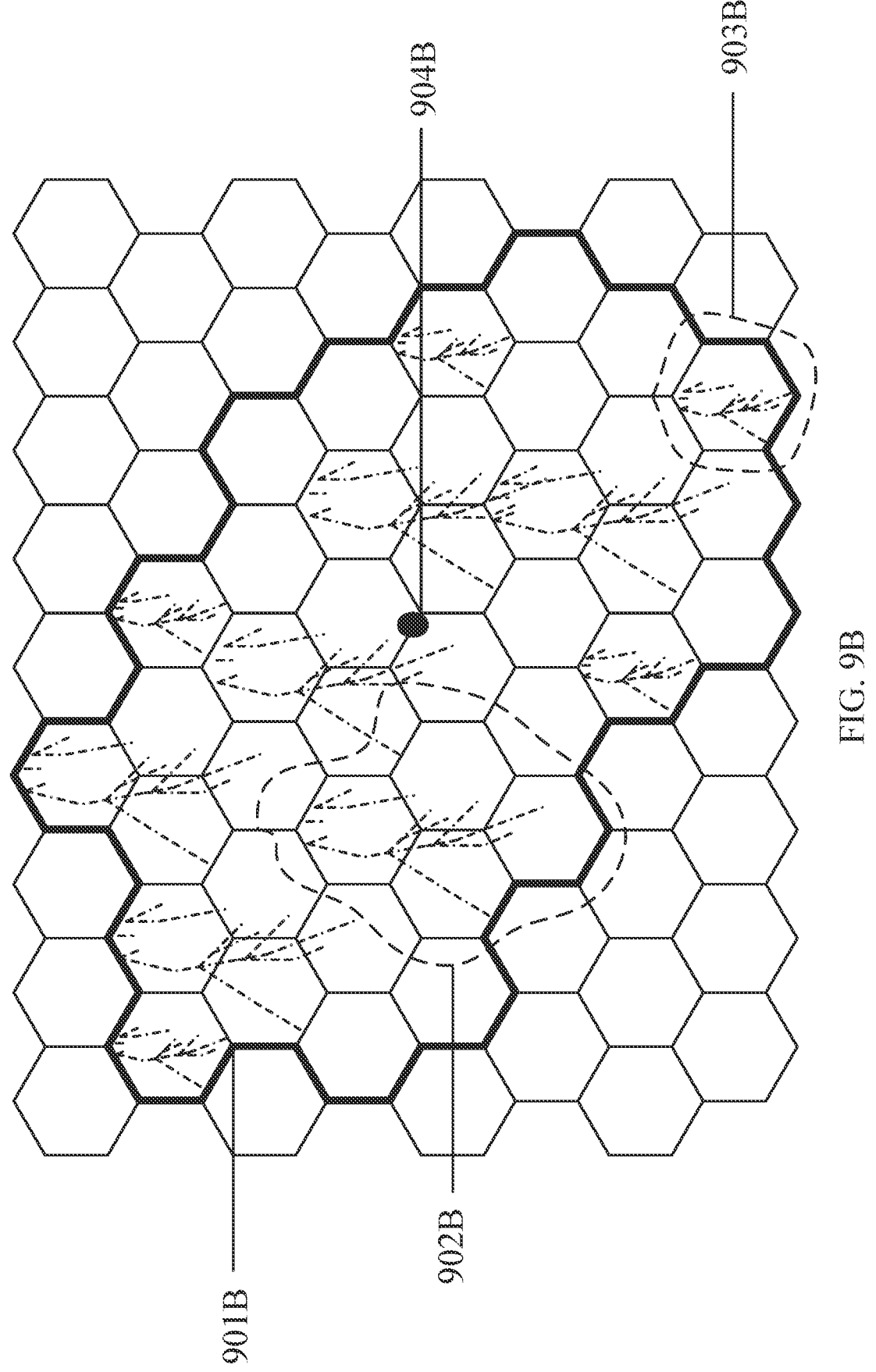
FIG. 9B is a schematic interface diagram of a virtual weather interaction method according to an embodiment of this application.

In an example, a special effect material is randomly played in a grid of the first region. Referring to FIG. 9B, FIG. 9B shows a process of playing the first special effect in a first region 901B. The first region shown in FIG. 9B includes 39 map grids. Special effect materials shown in FIG. 9B include a four-grid special effect material and a single-grid special effect material. The first special effect played each time may include a plurality of single-grid special effect materials and a plurality of four-grid special effect materials. The following processing is performed on each special effect material. A single-grid special effect material A and a four-grid special effect material B are used as an example for description. The first special effect corresponding to the first weather state is played in the first region a plurality of times. During the first playing of the first special effect corresponding to the first weather state in the first region, the four-grid special effect material is played in a subregion 902B of the first region. The subregion 902B includes four map grids. The single-grid special effect material is played in a subregion 903B of a second region. The subregion 903B includes a single map grid. A sum of sizes of at least one subregion is less than a size of the first region. For example, the first playing is performed in 20 map grids, and special effect materials are synchronously played in the 20 (which may be configured to another number) map grids. During the second playing, special effect materials are synchronously played in 16 (which may be configured to another number) map grids. The map grids involved in the two plays may be the same or different. A time interval between any two adjacent plays is not greater than a single playing time of the special effect material. In this way, when the first weather state is maintained, the weather special effect material continues to be played to represent the weather state in real time.

In some embodiments, the subregion and the special effect material played in the subregion have at least one of the following relationships: a center distance of the subregion is negatively correlated to the size of the special effect material, or a center distance of the subregion is negatively correlated to significance of the special effect material, the center distance being a distance between a center of the subregion and a center of the first region. Through the relationship between the subregion and the special effect material, the first special effect can be displayed differentially, thereby improving information richness of the special effect.

In an example, referring to FIG. 9B, a center distance between the subregion 902B and a center 904B of the first region is less than a center distance between the subregion 903B and the center 904B of the first region. Therefore, significance of the four-grid special effect material played in the subregion 902B is greater than significance of the single-grid special effect material played in the subregion 903B. The center distance between the subregion 902B and the center 904B of the first region is less than the center distance between the subregion 903B and the center 904B of the first region, and a size of the four-grid special effect material is clearly greater than a size of the single-grid special effect material. That is, a special effect material with a larger size is preferentially played inside the first region randomly, and a special effect material with a smaller size is preferentially played at an edge of the first region randomly. For example, the size of the four-grid special effect material is greater than the size of the single-grid special effect material. Therefore, the four-grid special effect material is preferentially played in the subregion 902B of an inside range of the first region, and the single-grid special effect material is preferentially played in the subregion 903B at the edge of the first region.

Figure 4C:
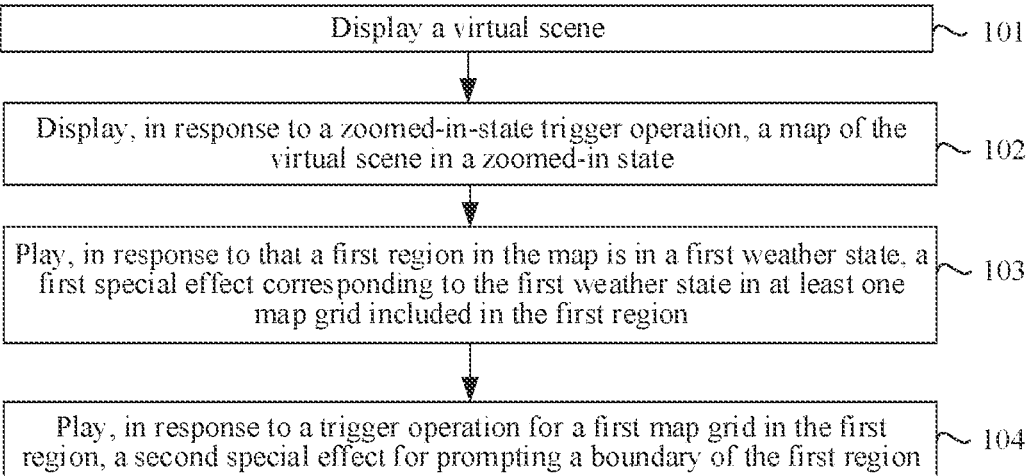

In some embodiments, referring to FIG. 4C, FIG. 4C is a schematic flowchart of a virtual weather interaction method according to an embodiment of this application. After step 103, step 104 may be performed.

Step 104: Play, in response to a trigger operation for a first map grid in the first region, a second special effect for prompting a boundary of the first region.

In an example, the first map grid is any map grid in the first region, the boundary of the first region is formed by connecting outer edges of the at least one map grid included in the first region, and the outer edge is an edge shared by the following two types of map grids: the at least one map grid included in the first region and a map grid outside the first region.

In some embodiments, step 104 of playing, in response to a trigger operation for a first map grid in the first region, a second special effect for prompting a boundary of the first region may be implemented through the following technical solution: performing any one of the following processing: in response to a persistent trigger operation for the first map grid, starting playing the second special effect until the persistent trigger operation is released; or in response to a non-persistent trigger operation for the first map grid, starting playing the second special effect until a set duration is reached; and playing a third special effect in the first map grid, the third special effect including either one of the following: a special effect attached to an edge of the first map grid or a special effect filling the first map grid. The second special effect for indicating the boundary of the first region can be clearly displayed through a manual trigger operation, so that the clarity of a region range of the first region can be improved.

Figure 5A:
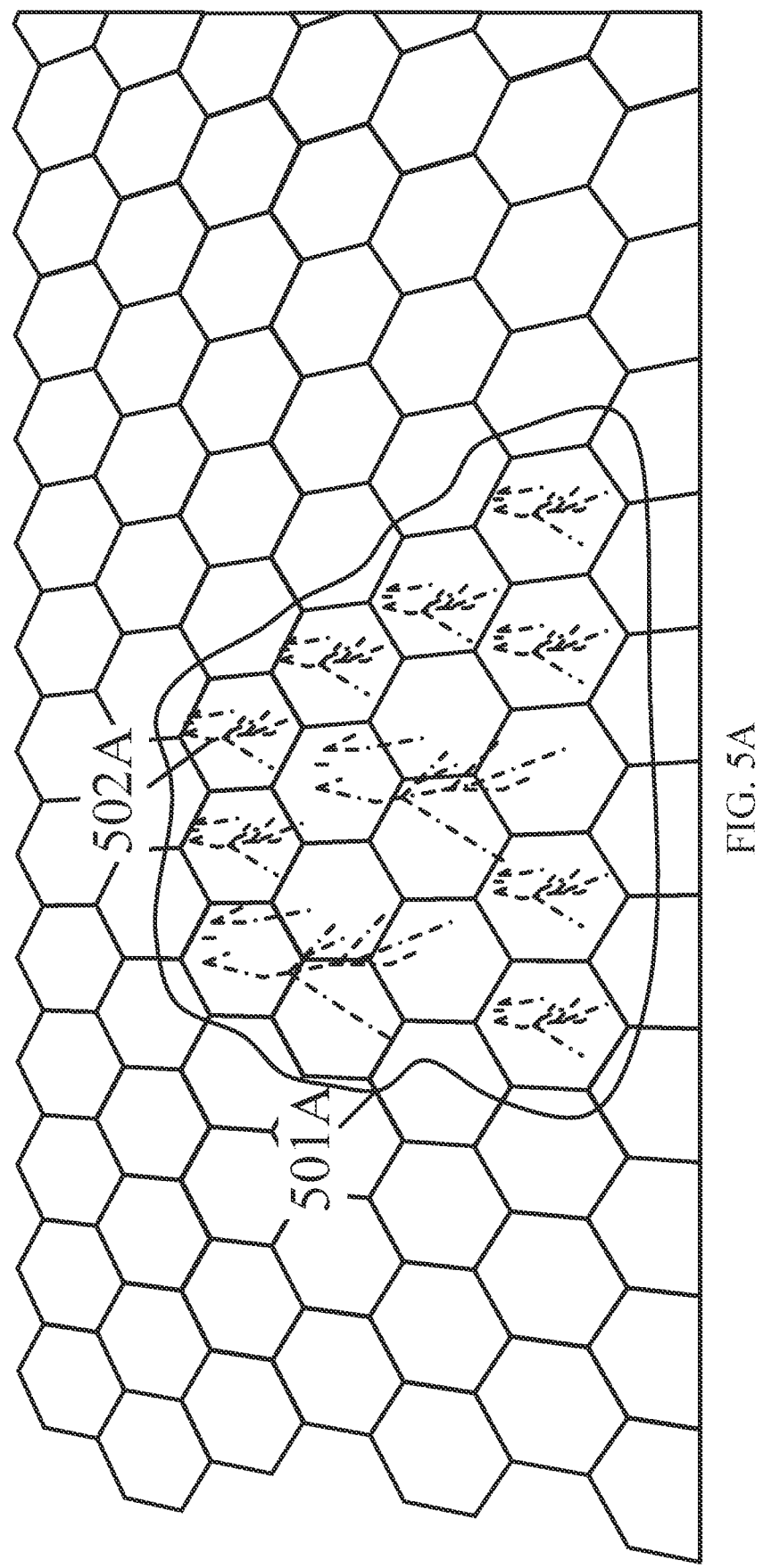
FIG. 5A is a schematic interface diagram of a virtual weather interaction method according to an embodiment of this application.
Figure 5B:
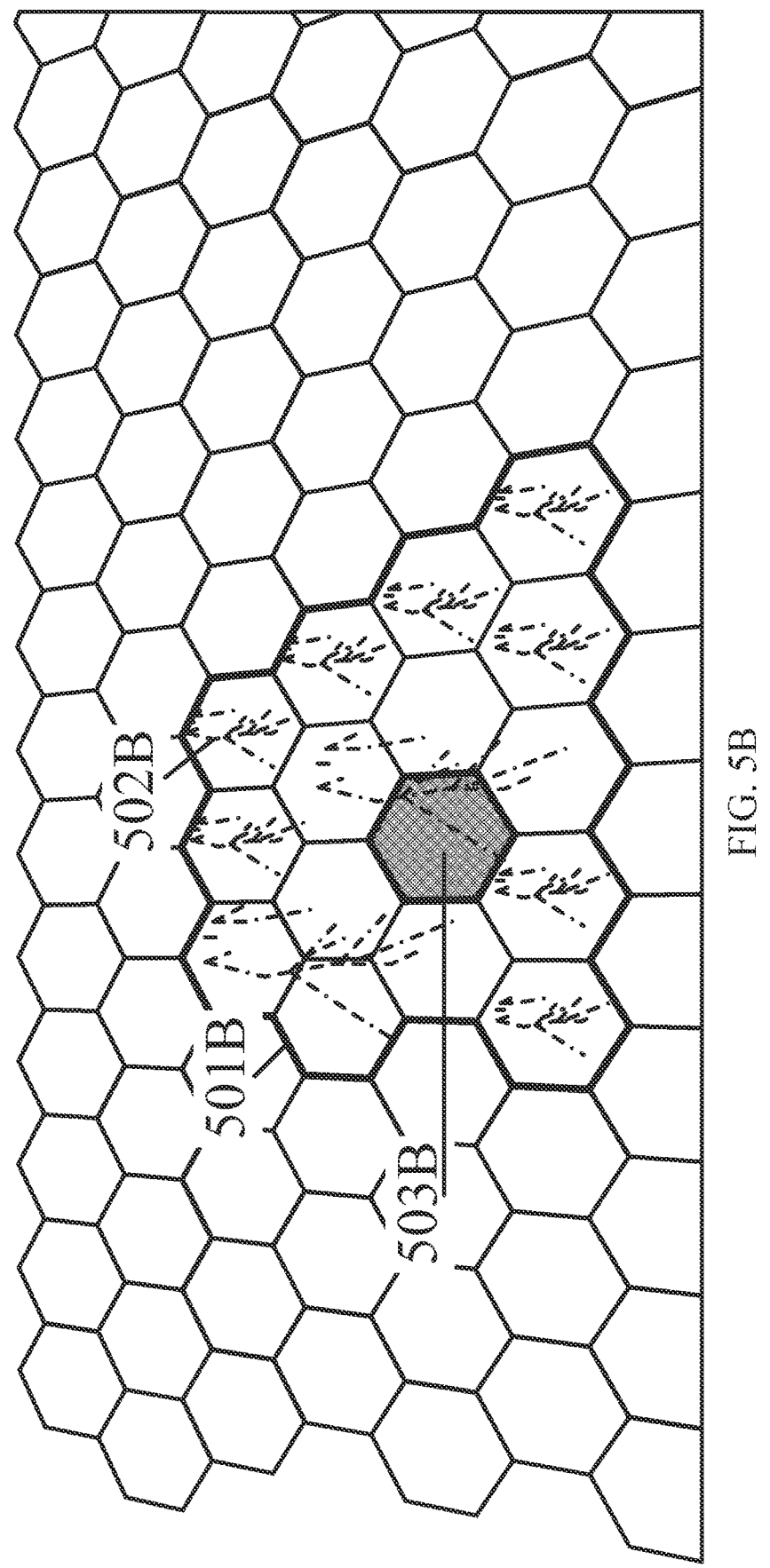
FIG. 5B is a schematic interface diagram of a virtual weather interaction method according to an embodiment of this application.

In an example, referring to FIG. 5B, in response to a trigger operation (for example, a select operation) for a first map grid 502 in the first region 501B, the second special effect for prompting the boundary of the first region is played. The second special effect may be a stroke special effect attached to the boundary of the first region. The stroke special effect is a special effect for enhancing the display of the boundary of the first region. The trigger operation may be a persistent trigger operation or a non-persistent trigger operation. When the trigger operation is a persistent trigger operation, the second special effect for prompting the boundary of the first region continues to be displayed as long as the persistent trigger operation is not released. When the trigger operation is a non-persistent trigger operation, the second special effect for prompting the boundary of the first region is displayed within a set time period even though the trigger operation is released. In addition to playing the second special effect for representing the boundary of the first region, a third special effect is also played on the first map grid 502. The third special effect may fill the first map grid 502. For example, a color different from colors of other map grids is filled. The third special effect may alternatively be a special effect attached to an edge of the first map grid, for example, a stroke special effect attached to the boundary of the first map grid.

In some embodiments, when at least one of the following conditions is met, a second special effect for prompting a boundary of the first region is played: a target virtual object enters the first region, the target virtual object being a virtual object controlled by an account that initiates the zoomed-in-state trigger operation; a virtual object in a different group from the target virtual object enters the first region; or the target virtual object uses a virtual item related to the first weather state in the first region, the boundary of the first region being formed by connecting outer edges of the at least one map grid included in the first region, and the outer edge being an edge shared by the following two types of map grids: the at least one map grid included in the first region and a map grid outside the first region. The second special effect for indicating the boundary of the first region can be clearly displayed in an automatic trigger manner, so that the clarity of a region range of the first region can be improved and human-computer interaction efficiency can be improved.

In an example, in addition to manually triggering the playing of the second special effect for prompting the boundary of the first region, the playing of the second special effect for prompting the boundary of the first region may also be automatically triggered. For example, the target virtual object is a virtual object controlled by a user A. The user A is a user that initiates the zoomed-in-state trigger operation. When the target virtual object enters the first region, the second special effect for prompting the boundary of the first region is automatically played, achieving an enhancement effect for prompting the boundary of the first region to the user. For example, when an enemy of the target virtual object (a virtual object belonging to a different group from the target virtual object) enters the first region, the second special effect for prompting the boundary of the first region is automatically played, achieving an enhancement effect for prompting a boundary of a region in which the enemy is located to the user. For example, the first weather state is a thunderstorm weather. When the target virtual object uses a lightning rod (a virtual item) in the first region, the second special effect for prompting the boundary of the first region is automatically played, which is equivalent to prompting an effective usage range of the item.

The following describes an exemplary application of the embodiments of this application in an actual application scenario.

An account may log in to a client (such as a game application of an online version) running on a terminal. The client responds to a zoomed-in-state trigger operation. The client sends operation data of the zoomed-in-state trigger operation to a server through a network. The server calculates display data of a map in a zoomed-in state based on the operation data, and sends the display data to the client. Based on the display data, the map in the zoomed-in state in a virtual scene is displayed in a human-computer interaction interface of the client, the map being formed by splicing a plurality of map grids. The server calculates, based on weather configuration data, weather special effect data and range data of a first region that is affected, and sends the weather special effect data and the range data to the client. Based on the weather special effect data and the range data, the following display is performed in the human-computer interaction interface of the client: playing a first special effect corresponding to a first weather state in at least one map grid included in the first region.

In some embodiments, in a weather display interaction solution provided in the embodiments of this application, switching may be performed between a map in a global state and a map in a zoomed-in state. When switching to displaying a global map in a global state, a weather distribution status of various places can be displayed, so that a player can quickly master an overall weather state. When switching to displaying a local map in a local state, a weather special effect within a grid is displayed, and accurate boundaries of a weather influence range are displayed based on the grid. This can flexibly adapt to weather state and boundary display of any irregular region (weather influence range).

In some embodiments, referring to FIG. 5A, FIG. 5A is a schematic interface diagram of a virtual weather interaction method according to an embodiment of this application. FIG. 5A shows that when a grid map of a two-dimensional interface is in a zoomed-in state, a weather animation special effect 502A is displayed in a region 501A influenced by a special weather. Referring to FIG. 5B, FIG. 5B is a schematic interface diagram of a virtual weather interaction method according to an embodiment of this application. FIG. 5B shows that when a grid map in a two-dimensional interface is in a zoomed-in state, in response to a select operation for a particular grid, an accurate boundary of a weather influence range is displayed. A weather animation special effect 502B is displayed in a region 501B influenced by a special weather. In response to a select operation for a map grid 503B, the map grid 503B being in the region 501B, a boundary of the region 501B is displayed (the boundary may be bolded). Referring to FIG. 5A and FIG. 5B, a weather special effect is filled and distributed in the entire region of the weather influence range by using a minimum single-frame animation or a minimum four-frame animation obtained after splitting. Regarding a playing sequence, a random delay can be performed, thereby ultimately showing a random and natural weather special effect presentation in the entire region.

In some embodiments, referring to FIG. 6, FIG. 6 is a schematic interface diagram of a virtual weather interaction method according to an embodiment of this application. When a map is zoomed out to a global state, a center point of a region of a weather influence range in a local map is mapped to the global map, and a weather symbol is displayed in the global map, for indicating a weather distribution status of various places in the global map.

Figure 7:
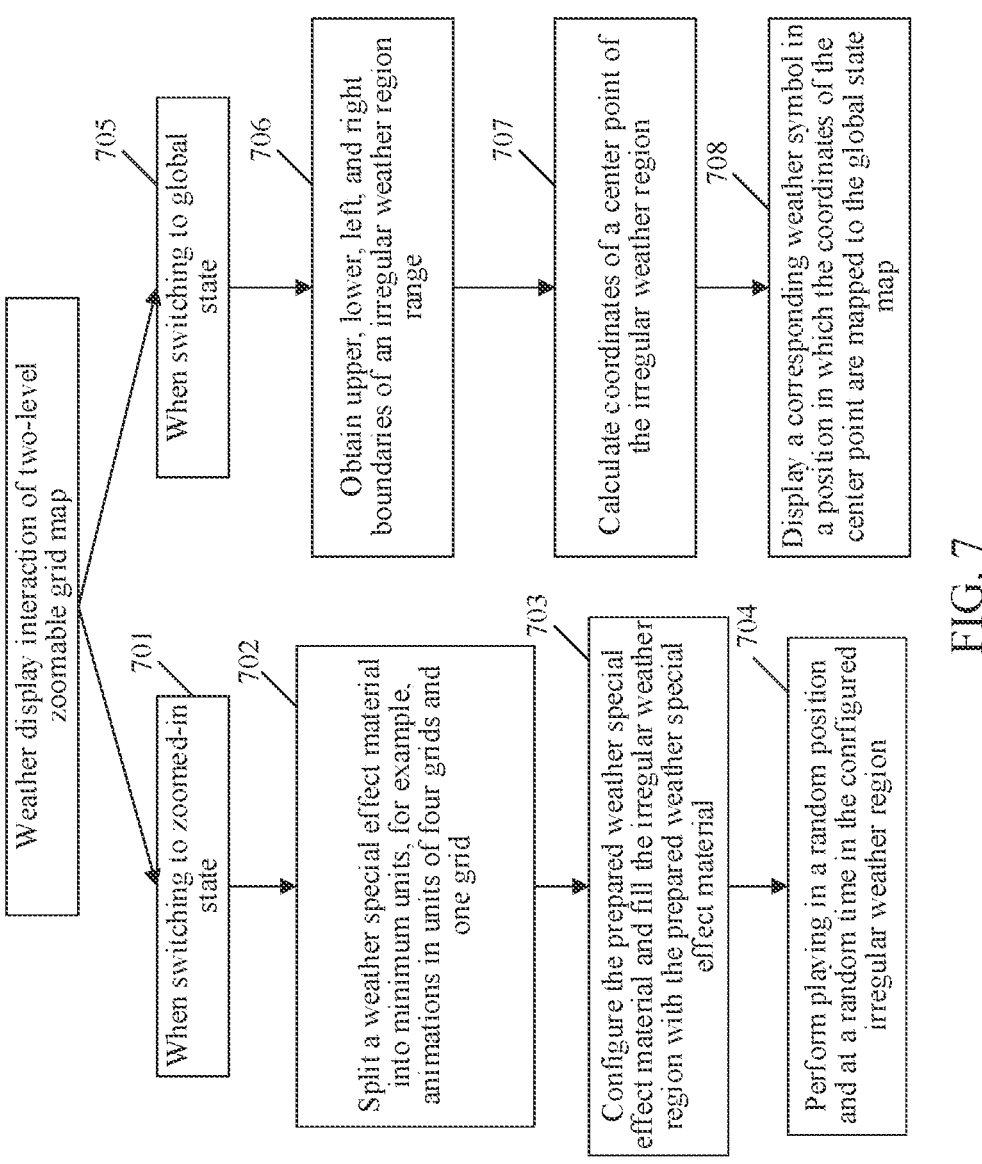
FIG. 7 is a schematic flowchart of a virtual weather interaction method according to an embodiment of this application.

In some embodiments, referring to FIG. 7, FIG. 7 is a schematic flowchart of a virtual weather interaction method according to an embodiment of this application. Step 701: Switch a map to a zoomed-in state for displaying. Step 702: Split a weather special effect material into a four-frame animation or a single-frame animation in a grid region of a weather influence range. Step 703: Configure the weather special effect material into the grid region of the weather influence range. Step 704: Randomly play the weather special effect material in the grid region of the weather influence range. Step 705: Switch the map to a global state for displaying. Step 706: Obtain an upper boundary, a lower boundary, a left boundary, and a right boundary of the grid region of the weather influence range. Step 707: Calculate coordinates of a center point of the grid region of the weather influence range. Step 708: Display a weather symbol in a position in which the coordinates of the center point are mapped to the global map.

In some embodiments, in a map in a partially zoomed-in state, a weather special effect material in a minimum unit obtained through splitting is filled in a grid map for random playing. Referring to FIG. 8A and FIG. 8B, FIG. 8A and FIG. 8B are each a schematic interface diagram of a virtual weather interaction method according to an embodiment of this application. A map in a virtual scene is a two-dimensional web map. The two-dimensional web map includes a plurality of grids. A weather influence range may be an irregular region formed by the plurality of grids. A weather special effect material is displayed in the irregular region. The special effect material may be split into minimum units, for example, a weather special effect played in four grids in FIG. 8A and a weather special effect played in one grid in FIG. 8B. Two different weather special effects may be preconfigured. The weather special effect is a one-time animation, for example, thunder and lightning lasting two to three seconds.

In some embodiments, referring to FIG. 9B, FIG. 9B is a schematic interface diagram of a virtual weather interaction method according to an embodiment of this application. The preconfigured weather special effects are filled in the weather influence range (the irregular region formed by the plurality of grids). The irregular region of the weather influence range is shown in FIG. 9B. The four-grid weather special effect is to be played in four grids of the irregular region. The one-grid weather special effect is to be played in one grid of the irregular region.

Figure 10:
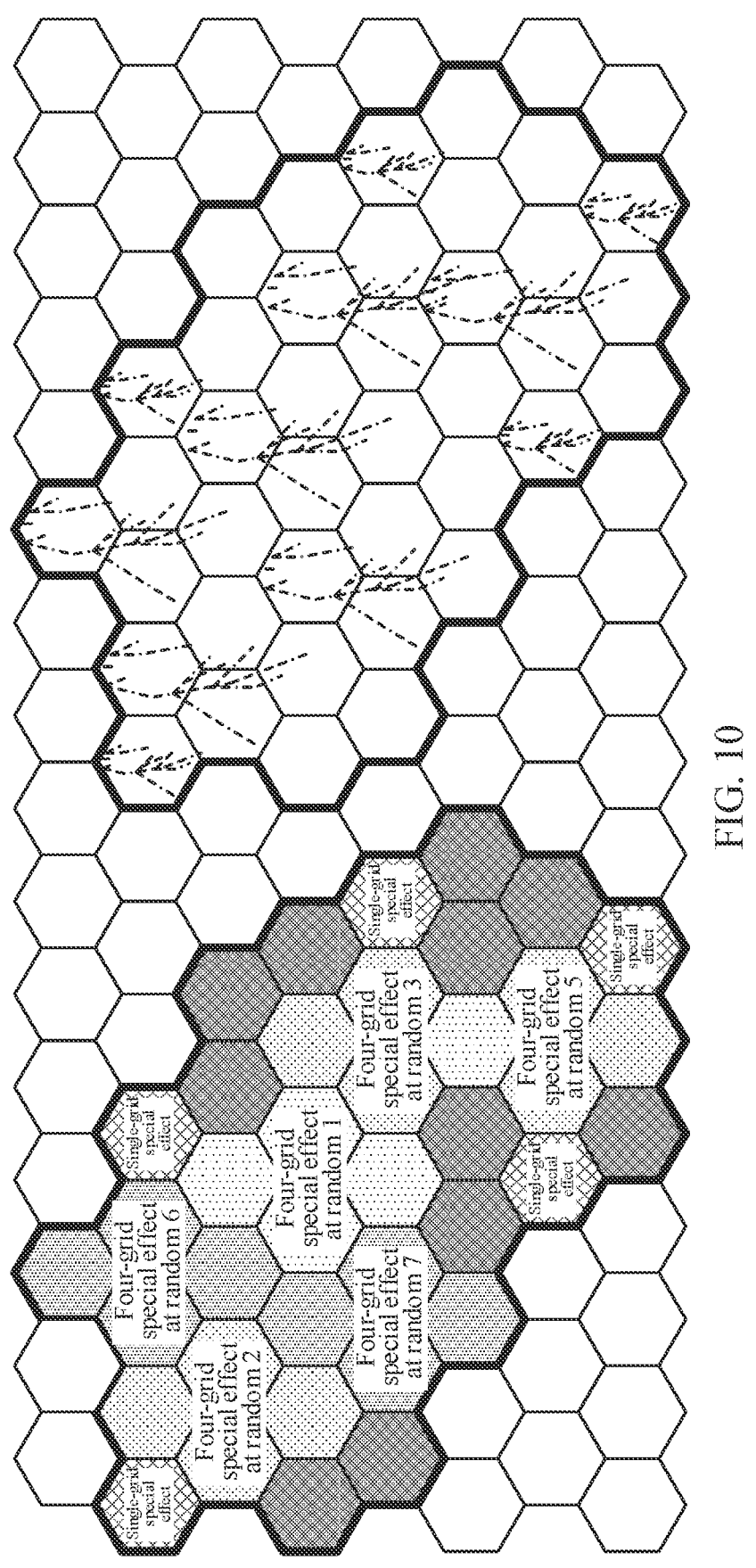
FIG. 10 is a schematic interface diagram of a virtual weather interaction method according to an embodiment of this application.

In some embodiments, referring to FIG. 10, FIG. 10 is a schematic interface diagram of a virtual weather interaction method according to an embodiment of this application. In a configured irregular weather region, a weather special effect is played in a random position and at a random time. Because both the time and the position are random, a visual presentation is a weather special effect of randomly and naturally playing a thunderstorm animation in the entire region within the irregular range. A four-grid weather special effect is preferentially played in the irregular weather region randomly. For example, if there are a plurality of four-grid regions on a map, it is preferentially ensured that a four-grid weather special effect is played in a four-grid region inside the irregular range. A one-grid weather special effect is preferentially played at an edge of the irregular weather region randomly. For example, if there are a plurality of one-grid regions on a map, it is preferentially ensured that a one-grid weather special effect is played in a one-grid region at an edge of the irregular range.

In some embodiments, referring to FIG. 11, FIG. 11 is a schematic diagram of coordinate positioning of a virtual weather interaction method according to an embodiment of this application. For an irregular weather region, coordinates of a center point are determined based on an upper boundary and a lower boundary. A weather symbol is displayed in a position in which the coordinates of the center point are mapped to a global map, so that global weather distribution can be indicated. A server obtains an upper boundary, a lower boundary, a left boundary, and a right boundary of the irregular weather region range. The upper boundary, the lower boundary, the left boundary, and the right boundary are shown as blue lines in the following figure. Subsequently, the coordinates of the center point of the irregular weather region are calculated. The calculation method is: obtaining a rectangular box formed by the upper boundary, the lower boundary, the left boundary, and the right boundary, then obtaining intersecting diagonals, using an intersection point of the diagonals as the center point of the irregular weather region, and obtaining the coordinates of the center point. The corresponding weather symbol is displayed in the position in which the coordinates of the center point are mapped to the global map. Specifically, as shown in FIG. 11, in the global map in the global state, the corresponding weather symbol is displayed through the obtained coordinates of the center point.

The embodiments of this application can resolve a problem of weather information presentation in a super-large grid map in a two-level zoomed-in-global state in a game using a two-dimensional interface. In the global state, a player can be enabled to quickly master the overall weather state. In the zoomed-in state, a weather special effect in a minimum unit is displayed in a weather region, and a boundary of the weather region is stroked for display. This can flexibly adapt to the display of a weather state of any irregular region and the display of a boundary of a region range, thereby effectively improving display flexibility and accuracy of weather special effects. In addition, the random method can achieve a natural visual presentation of weather special effects at relatively low costs and can be widely used.

It can be understood that, user information and other related data are involved in the embodiments of this application. When the embodiments of this application are applied to a specific product or technology, user permission or consent is required, and collection, use, and processing of the related data need to comply with the relevant laws, regulations, and standards of the relevant countries and regions.

The following further describes an exemplary structure of the virtual weather interaction apparatus 455 provided in the embodiments of this application that is implemented as a software module. In some embodiments, as shown in FIG. 3, the software module of the virtual weather interaction apparatus 455 that is stored in the memory 450 may include: a display module 4551, configured to display a virtual scene, at least one weather state being configured in the virtual scene; a zoom-in module 4552, configured to display, in response to a zoomed-in-state trigger operation, a map of the virtual scene in a zoomed-in state, the map being formed by splicing a plurality of map grids; and a weather module 4553, configured to play, in response to that a first region in the map in the zoomed-in state is in a first weather state, a first special effect corresponding to the first weather state in at least one map grid included in the first region, the first weather state being one of the at least one weather state.

In some embodiments, the zoom-in module 4552 is further configured to: display, in response to a global-state trigger operation, a map of the virtual scene in a global state, a region range indicated by the map exceeding a region range threshold, or a scale of the map being less than a scale threshold.

In some embodiments, during the displaying a map of the virtual scene in a global state, the zoom-in module 4552 is further configured to: display, in a central position of each second region in the map in the global state, prompt information of a second weather state corresponding to the second region, the prompt information including at least one of the following: a weather symbol set or a weather name set.

In some embodiments, the zoom-in module 4552 is further configured to perform the following processing for the each second region: performing supplementary processing on the second region in the map in the zoomed-in state to obtain a rectangle including the second region; obtaining diagonals of the rectangle in the map in the zoomed-in state and obtaining a position of an intersection point of the diagonals in the map in the zoomed-in state; and determining the central position of the second region in the map in the global state based on the position of the intersection point in the map in the zoomed-in state.

In some embodiments, the zoom-in module 4552 is further configured to perform the following processing for the each second region: displaying, in the central position of the second region in a first display manner, the prompt information of the second weather state corresponding to the second region, significance of the first display manner being positively correlated to a virtual parameter, the virtual parameter including at least one of the following: the number of virtual objects in the second region, an area of the second region, a severity degree of the second weather state, or a distance between a target virtual object and the central position, and the target virtual object being a virtual object controlled by an account that initiates the zoomed-in-state trigger operation.

In some embodiments, the weather module 4553 is further configured to: synchronously play the first special effect corresponding to the first weather state in each map grid included in the first region; or randomly play the first special effect corresponding to the first weather state in the at least one map grid included in the first region.

In some embodiments, the first special effect includes at least one special effect material, the first region includes at least one subregion, and the weather module 4553 is further configured to synchronously perform the following processing for each subregion: playing a special effect material having a same size as the subregion in the subregion of the first region, the each subregion including at least one map grid.

In some embodiments, the first special effect includes at least one special effect material, the first region includes a plurality of subregions, and the weather module 4553 is further configured to: play the first special effect corresponding to the first weather state in the first region a plurality of times; and when playing the first special effect each time, synchronously perform the following processing for some subregions of the first region: playing a special effect material having a same size as each of the subregions in the subregion, the subregion including at least one map grid, and a time interval between any two adjacent plays being not greater than a single playing time of the special effect material.

In some embodiments, the subregion and the special effect material played in the subregion have at least one of the following relationships: a center distance of the subregion is negatively correlated to the size of the special effect material, or a center distance of the subregion is negatively correlated to significance of the special effect material, the center distance being a distance between a center of the subregion and a center of the first region.

In some embodiments, the weather module 4553 is further configured to play, in response to a trigger operation for a first map grid in the first region, a second special effect for prompting a boundary of the first region, the first map grid being any map grid in the first region, the boundary of the first region being formed by connecting outer edges of the at least one map grid included in the first region, and the outer edge being an edge shared by the following two types of map grids: the at least one map grid included in the first region and a map grid outside the first region.

In some embodiments, the weather module 4553 is further configured to perform any one of the following processing: in response to a persistent trigger operation for the first map grid, starting playing the second special effect until the persistent trigger operation is released; or in response to a non-persistent trigger operation for the first map grid, starting playing the second special effect until a set duration is reached; and playing a third special effect in the first map grid, the third special effect including either one of the following: a special effect attached to an edge of the first map grid or a special effect filling the first map grid.

In some embodiments, the weather module 4553 is further configured to: when at least one of the following conditions is met, play a second special effect for prompting a boundary of the first region: a target virtual object enters the first region, the target virtual object being a virtual object controlled by an account that initiates the zoomed-in-state trigger operation; a virtual object in a different group from the target virtual object enters the first region; or the target virtual object uses a virtual item related to the first weather state in the first region, the boundary of the first region being formed by connecting outer edges of the at least one map grid included in the first region, and the outer edge being an edge shared by the following two types of map grids: the at least one map grid included in the first region and a map grid outside the first region.

In some embodiments, when the zoomed-in-state trigger operation is an accompanying operation, the zoom-in module 4552 is further configured to: display a process of increasing a scale the map until the accompanying operation is released; and in parallel to increasing the scale, display a process of forming the plurality of map grids in the map.

In some embodiments, when the zoomed-in-state trigger operation is a single setting operation, the zoom-in module 4552 is further configured to: in response to a single setting operation for a target scale, display a map conforming to the target scale, and display the plurality of map grids in the map.

An embodiment of this application provides a computer program product. The computer program product includes a computer executable instruction. The computer executable instruction is stored in a non-transitory computer-readable storage medium. A processor of an electronic device reads the computer executable instruction from the computer-readable storage medium. The processor executes the computer executable instruction, so that the electronic device performs the virtual weather interaction method in the embodiments of this application.

An embodiment of this application provides a non-transitory computer-readable storage medium storing a computer executable instruction. The computer executable instruction, when executed by a processor of an electronic device, causes the electronic device to perform the virtual weather interaction method provided in the embodiments of this application, for example, the virtual weather interaction method shown in FIG. 4A to FIG. 4C.

In some embodiments, the computer-readable storage medium may be a memory such as a FRAM, a ROM, a PROM, an EPROM, an EEPROM, a flash memory, a magnetic surface memory, a compact disc, or a CD-ROM; or various devices including one of or any combination of the foregoing memories.

In some embodiments, the computer executable instruction may be written in the form of a program, software, a software module, a script, or code in any form of programming language (including complied or interpreted languages, or declarative or procedural languages), and may be deployed in any form, including being deployed as a stand-alone program or deployed as a module, a component, a subroutine, or other units suitable for use in a computing environment. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

In an example, the computer executable instruction may, but does not necessarily, correspond to a file in a file system, and may be stored in part of a file that holds other programs or data, for example, stored in one or more scripts in a Hyper Text Markup Language (HTML) document, or in a single file specifically used for the program under discussion, or in a plurality of collaborative files (for example, files storing one or more modules, subprograms, or code sections).

In an example, the computer executable instruction may be deployed to be executed on one electronic device, or executed on a plurality of electronic devices at the same location, or executed on a plurality of electronic devices that are distributed at a plurality of locations and interconnected through a communication network.

To sum up, in the embodiments of this application, a map in a zoomed-in state formed by splicing a plurality of map grids in a virtual scene is displayed. In response to that a first region in the map is in a first weather state, a first special effect corresponding to the first weather state is played in at least one map grid included in the first region. Because the first special effect corresponding to the first weather state is played in the map grid in the first region, an influence range of the first weather state can be accurately reflected by using the grid. In addition, using the map grid as a carrier for the playing of the special effect can improve the playing flexibility of the first special effect.

The foregoing descriptions are merely embodiments of this application and are not intended to limit the protection scope of this application. Any modification, equivalent replacement, or improvement made without departing from the spirit and scope of this application shall fall within the protection scope of this application.

What is claimed is:

1. A virtual weather interaction method, performed by an electronic device, and the method comprising:
   displaying a two-dimensional map of a virtual scene;
   in response to a zoomed-in-state trigger operation, displaying a first region of the two-dimensional map in a zoomed-in state, wherein the first region includes a plurality of map grids;
   in accordance with a determination that the first region in the two-dimensional map in the zoomed-in state is in a first weather state, starting playing a first special effect corresponding to the first weather state in at least one map grid comprised in the first region randomly selected from the plurality of map grids and into others of the plurality of map grids until the zoomed-in-state trigger operation is released or a set duration is reached;
   in response to a global-state trigger operation, displaying the two dimensional map of the virtual scene in a global state; and displaying a weather symbol corresponding to the first weather state on the first region of the two-dimensional map in the global state.

2. The method according to claim 1, wherein the two-dimensional map includes a second region in the global state and the method further comprises:

displaying, in a central position of the second region in the map in the global state, prompt information of a second weather state corresponding to the second region, the prompt information comprising at least one of the following: a weather symbol set or a weather name set.

3. The method according to claim 1, wherein the playing a first special effect corresponding to the first weather state in at least one map grid comprised in the first region randomly selected from the plurality of map grids comprises:

adding a random delay into the playing the first special effect corresponding to the first weather state in the at least one map grid comprised in the first region randomly selected from the plurality of map grids.

4. The method according to claim 3, wherein the random delay between any two adjacent plays is not greater than a single playing time of the first special effect.

5. The method according to claim 1, wherein the starting playing the first special effect corresponding to the first weather state in at least one map grid comprised in the first region randomly selected from the plurality of map grids comprises:

playing a special effect material having a same size of a map grid in the at least one map grid comprised in the first region, wherein a center distance of the map grid is negatively correlated to a size of the special effect material, or a center distance of the map grid is negatively correlated to significance of the special effect material, the center distance being a distance between a center of the map grid and a center of the first region.

6. The method according to claim 1, further comprising:

in response to a trigger operation for a first map grid in the first region in the zoomed-in state, playing a second special effect for prompting a boundary of the first region, wherein the second special effect is different from the first special effect.

7. The method according to claim 6, wherein the second special effect for prompting the boundary of the first region is triggered when at least one of the following conditions is met:

a target virtual object enters the first region, the target virtual object being a virtual object controlled by an account that initiates the zoomed-in-state trigger operation;

a virtual object in a different group from the target virtual object enters the first region; or the target virtual object uses a virtual item related to the first weather state in the first region.

8. The method according to claim 1, wherein the displaying a first region of the two-dimensional map in a zoomed-in state comprises:

displaying a process of increasing a scale of the first region until the zoomed-in-state trigger operation is released; and in parallel to increasing the scale, displaying a process of forming the plurality of map grids in the first region.

9. An electronic device, comprising:

a memory, configured to store a computer executable instruction; and a processor, configured to execute the computer executable instruction stored in the memory to implement a virtual weather interaction method including:

displaying a two-dimensional map of a virtual scene;

in response to a zoomed-in-state trigger operation, displaying a first region of the two-dimensional map in a zoomed-in state, wherein the first region includes a plurality of map grids;

in accordance with a determination that the first region in the two-dimensional map in the zoomed-in state is in a first weather state, starting playing a first special effect corresponding to the first weather state in at least one map grid comprised in the first region randomly selected from the plurality of map grids and into others of the plurality of map grids until the zoomed-in-state trigger operation is released or a set duration is reached;

in response to a global-state trigger operation, displaying the two dimensional map of the virtual scene in a global state; and displaying a weather symbol corresponding to the first weather state on the first region of the two-dimensional map in the global state.

10. The electronic device according to claim 9, wherein the two-dimensional map includes a second region in the global state and the method further comprises:

displaying, in a central position of the second region in the map in the global state, prompt information of a second weather state corresponding to the second region, the prompt information comprising at least one of the following: a weather symbol set or a weather name set.

11. The electronic device according to claim 9, wherein the playing a first special effect corresponding to the first weather state in at least one map grid comprised in the first region randomly selected from the plurality of map grids comprises:

adding a random delay into the playing the first special effect corresponding to the first weather state in the at least one map grid comprised in the first region randomly selected from the plurality of map grids.

12. The electronic device according to claim 11, wherein the random delay between any two adjacent plays is not greater than a single playing time of the first special effect.

13. The electronic device according to claim 9, wherein the starting playing the first special effect corresponding to the first weather state in at least one map grid comprised in the first region randomly selected from the plurality of map grids comprises:

playing a special effect material having a same size of a map grid in the at least one map grid comprised in the first region, wherein a center distance of the map grid is negatively correlated to a size of the special effect material, or a center distance of the map grid is negatively correlated to significance of the special effect material, the center distance being a distance between a center of the map grid and a center of the first region.

14. The electronic device according to claim 9, wherein the method further comprises:

in response to a trigger operation for a first map grid in the first region in the zoomed-in state, playing a second special effect for prompting a boundary of the first region, wherein the second special effect is different from the first special effect.

15. The electronic device according to claim 14, wherein the second special effect for prompting the boundary of the first region is triggered when at least one of the following conditions is met:

a target virtual object enters the first region, the target virtual object being a virtual object controlled by an account that initiates the zoomed-in-state trigger operation;

a virtual object in a different group from the target virtual object enters the first region; or the target virtual object uses a virtual item related to the first weather state in the first region.

16. The electronic device according to claim 9, wherein the displaying a first region of the two-dimensional map in a zoomed-in state comprises:

displaying a process of increasing a scale of the first region until the zoomed-in-state trigger operation is released; and in parallel to increasing the scale, displaying a process of forming the plurality of map grids in the first region.

17. A non-transitory computer-readable storage medium, storing a computer executable instruction, the computer executable instruction, when executed by a processor of an electronic device, causing the electronic device to implement a virtual weather interaction method including:

displaying a two-dimensional map of a virtual scene;

in response to a zoomed-in-state trigger operation, displaying a first region of the two-dimensional map in a zoomed-in state, wherein the first region includes a plurality of map grids;

in accordance with a determination that the first region in the two-dimensional map in the zoomed-in state is in a first weather state, starting playing a first special effect corresponding to the first weather state in at least one map grid comprised in the first region randomly selected from the plurality of map grids and into others of the plurality of map grids until the zoomed-in-state trigger operation is released or a set duration is reached;

in response to a global-state trigger operation, displaying the two dimensional map of the virtual scene in a global state; and

displaying a weather symbol corresponding to the first weather state on the first region of the two-dimensional map in the global state.

18. The non-transitory computer-readable storage medium according to claim 17, wherein the two-dimensional map includes a second region in the global state and the method further comprises:

displaying, in a central position of the second region in the map in the global state, prompt information of a second weather state corresponding to the second region, the prompt information comprising at least one of the following: a weather symbol set or a weather name set.

19. The non-transitory computer-readable storage medium according to claim 17, wherein the playing a first special effect corresponding to the first weather state in at least one map grid comprised in the first region randomly selected from the plurality of map grids comprises:

adding a random delay into the playing the first special effect corresponding to the first weather state in the at least one map grid comprised in the first region randomly selected from the plurality of map grids.

20. The non-transitory computer-readable storage medium according to claim 17, wherein the starting playing the first special effect corresponding to the first weather state in at least one map grid comprised in the first region randomly selected from the plurality of map grids comprises:

playing a special effect material having a same size of a map grid in the at least one map grid comprised in the first region, wherein a center distance of the map grid is negatively correlated to a size of the special effect material, or a center distance of the map grid is negatively correlated to significance of the special effect material, the center distance being a distance between a center of the map grid and a center of the first region.

* * * * *